(12) United States Patent
Hedayat

(10) Patent No.: US 10,523,379 B2
(45) Date of Patent: Dec. 31, 2019

(54) MULTIUSER SIGNALING AND ACCESS REQUEST MECHANISMS

(71) Applicant: NEWRACOM, INC., Lake Forest, CA (US)

(72) Inventor: Ahmad Reza Hedayat, Aliso Viejo, CA (US)

(73) Assignee: NEWRACOM, INC., Lake Forest, CA (US)

( * ) Notice: Subject to any disclaimer, the term of this patent is extended or adjusted under 35 U.S.C. 154(b) by 0 days.

(21) Appl. No.: 16/000,576

(22) Filed: Jun. 5, 2018

(65) Prior Publication Data
US 2018/0351709 A1  Dec. 6, 2018

Related U.S. Application Data

(62) Division of application No. 14/876,712, filed on Oct. 6, 2015, now Pat. No. 9,991,995.
(Continued)

(51) Int. Cl.
*H04L 5/00* (2006.01)
*H04L 29/06* (2006.01)
(Continued)

(52) U.S. Cl.
CPC .......... *H04L 5/0007* (2013.01); *H04L 5/0037* (2013.01); *H04L 5/0053* (2013.01);
(Continued)

(58) Field of Classification Search
None
See application file for complete search history.

(56) References Cited

U.S. PATENT DOCUMENTS

2013/0294309 A1*  11/2013  Choi ................. H04W 52/0209
                                                    370/311
2013/0294394 A1*  11/2013  Kneckt ............. H04W 74/0816
                                                    370/329
(Continued)

OTHER PUBLICATIONS

LAN/MAN Standards Committee of the IEEE Computer Society, "IEEE P802.11ah™/D5.0 Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 2: Sub 1 GHz License Exempt Operation," Mar. 2015.
(Continued)

*Primary Examiner* — Mohammad S Adhami
(74) *Attorney, Agent, or Firm* — Morgan, Lewis & Bockius LLP

(57) ABSTRACT

In an example of wireless communications, an access point (AP) may send a first trigger frame to multiple stations. In response, some or all of the stations may transmit their respective uplink frames to the AP. The uplink frames may include status information of the stations such as buffered data size. The AP may send a second trigger frame, including resource allocation assignments to inform stations which sub-bands may be used to send their payloads to the AP. The AP may allocate sub-bands to stations based on the status information of the station. The AP may allocate a relatively narrow sub-band to one or more stations when the status information is not known to the AP. Status information may be provided in certain control fields of a data frame. Random access may be provided by assigning a sub-band to multiple stations. Other methods, apparatus, and computer-readable media are also disclosed.

20 Claims, 11 Drawing Sheets

Related U.S. Application Data

(60) Provisional application No. 62/157,855, filed on May 6, 2015, provisional application No. 62/152,705, filed on Apr. 24, 2015, provisional application No. 62/060,527, filed on Oct. 6, 2014.

(51) Int. Cl.
*H04W 72/12* (2009.01)
*H04W 84/12* (2009.01)
*H04W 74/06* (2009.01)

(52) U.S. Cl.
CPC .......... *H04L 65/4076* (2013.01); *H04L 65/80* (2013.01); *H04W 72/1284* (2013.01); *H04W 74/06* (2013.01); *H04W 84/12* (2013.01)

(56) References Cited

U.S. PATENT DOCUMENTS

| | | | | |
|---|---|---|---|---|
| 2014/0119316 A1* | 5/2014 | Linden | .................. | H04L 5/0044 370/329 |
| 2017/0104570 A1* | 4/2017 | Kim | ........................ | H04B 7/26 |
| 2017/0127298 A1* | 5/2017 | Ryu | ..................... | H04L 5/0055 |

OTHER PUBLICATIONS

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz," 2013.

LAN/MAN Standards Committee of the IEEE Computer Society, "IEEE Standard for Information technology—Telecommunications and information exchange between systems Local and metropolitan area networks—Specific requirements, Part 11: Wireless LAN Medium Access Control (MAC) and Physical Layer (PHY) Specifications," 2012.

* cited by examiner

MULTIUSER SIGNALING AND ACCESS REQUEST MECHANISMS

CROSS-REFERENCE TO RELATED APPLICATIONS

This application is a divisional application of U.S. application Ser. No. 14/876,712, entitled "MULTIUSER SIGNALING AND ACCESS REQUEST MECHANISMS," filed on Oct. 6, 2015, now U.S. Pat. No. 9,991,995, which claims the benefit of U.S. Provisional Application No. 62/157,855, entitled "UPLINK MULTIUSER SIGNALING METHODS AND ACCESS REQUEST," filed May 6, 2015, U.S. Provisional Application No. 62/152,705, entitled "METHODS TO REQUEST FOR UPLINK MULTIUSER ASSIGNMENTS," filed Apr. 24, 2015, and U.S. Provisional Application No. 62/060,527, entitled "EFFICIENT BW REQUEST PROCEDURE FOR UL MULTIUSER TRANSMISSION," filed Oct. 6, 2014, all of which are incorporated herein by reference in their entirety.

TECHNICAL FIELD

The present description relates in general to wireless communication systems and methods, and more particularly to, for example, without limitation, multiuser signaling and access request mechanisms.

BACKGROUND

Wireless local area network (WLAN) devices are deployed in diverse environments. These environments are generally characterized by the existence of access points and non-access point stations. Increased interference from neighboring devices gives rise to performance degradation. Additionally, WLAN devices are increasingly required to support a variety of applications such as video, cloud access, and offloading. In particular, video traffic is expected to be the dominant type of traffic in many high efficiency WLAN deployments. With the real-time requirements of some of these applications, WLAN users demand improved performance in delivering their applications, including improved power consumption for battery-operated devices.

The description provided in the background section should not be assumed to be prior art merely because it is mentioned in or associated with the background section. The background section may include information that describes one or more aspects of the subject technology.

Figure 1:
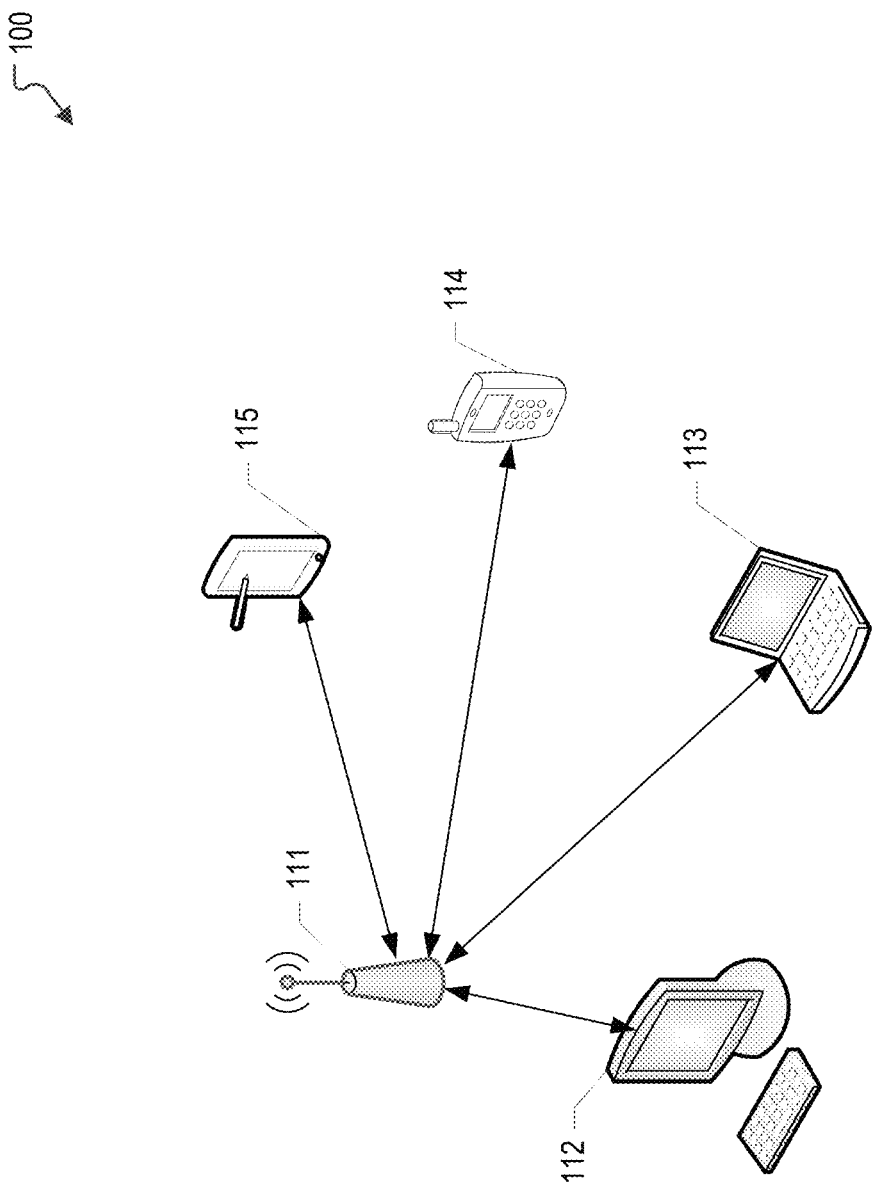
FIG. 1 illustrates a schematic diagram of an example of a wireless communication network.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Multiuser (MU) transmission in next-generation WLAN systems include techniques such as downlink/uplink (DL/UL) MU multiple-input/multiple-output (MIMO) and DL/UL orthogonal frequency division multiple access (OFDMA). However, since WLAN systems operate in unlicensed bands, there is a need to ensure that when an access point (AP) sends a MU transmission frame to several stations (STAs), protection mechanisms, such as request-to-send/clear-to-send (RTS/CTS), are employed appropriately to reduce potential frame collisions. There is an RTS/CTS procedure that has been adopted in early amendments of an Institute of Electrical and Electronics Engineers (IEEE) 802.11 wireless networking protocol; however, the procedure is limited to single-user transmissions. While newer versions of the IEEE 802.11 wireless networking protocol introduce a DL MU MIMO technique, the protocol does not introduce any new and multiuser-specific RTS/CTS procedures. With an increasing emphasis on MU techniques, there is a further need for proper RTS/CTS procedures that work efficiently and robustly for DL OFDMA and DL MU MIMO.

Beyond the need for a proper RTS/CTS exchange mechanism, in one aspect, there is also a need for a proper bandwidth-request mechanism (or air-time request as mentioned in other wireless networking protocol technologies) for UL multiuser transmissions. For instance, consider that a next-generation IEEE 802.11 wireless networking protocol adopts a UL multiuser transmission. In order for the AP to schedule a UL multiuser transmission such as UL MU MIMO or UL OFDMA, the AP would need to determine which STAs participate in the UL transmission, and where in time/frequency/space-domain each STA sends its respective physical layer convergence protocol (PLCP) protocol data unit (PPDU) within a multiuser PPDU to the AP.

For UL multiuser transmission, in one aspect, there is also a need for an efficient and robust frame exchange between the AP and potential participating STAs where the following can be achieved: (a) legacy STAs defer properly, (b) unintended next-generation or high-efficiency (HE) STAs defer properly, and (c) participating next-generation or HE STAs have a mechanism to send requests (or request frames) for resources that such STAs may employ in an upcoming UL multiuser transmission. Each such request may be referred to as a bandwidth request (BWR) or an uplink request (ULR), and each such request frame may be referred to as a BWR frame or a URL frame. In one or more aspects, the term "resource" may refer to, for example, bandwidth, time/duration that the STAs expect to occupy the medium, and/or possibly the number of spatial streams that the STAs may use. Note that while time, frequency, and spatial streams are inherently separate domains, for a given modulation and coding scheme (MCS) and a given number of bytes of data that an STA intends to send, these domains would be dependent domains.

One or more aspects of the present disclosure offers a mechanism for UL multiuser transmission, through the help of a robust legacy frame exchange a proper deference by legacy STAs is ensured, and participating STAs send their BWR frames to the AP, after which the AP sends a frame that simultaneously triggers the UL multiuser transmission as well as informs the STAs how to send their PPDUs inside the UL multiuser PPDU.

One or more aspects of the present disclosure describe efficient and robust methods that can be used between a pair of STAs while they exchange frames in an MU format, such as OFDMA. In a DL OFDMA frame, a node such as an AP transmits payloads to multiple STAs, and the AP determines which sub-band (i.e., a contiguous subset of tones) or sub-bands to send the payload of each recipient STA. Similarly, for UL OFDMA, the AP schedules which STAs to use which sub-band(s) to send their payloads to the AP. Several procedures are provided to allow an AP to schedule for a UL MU-MIMO PPDU or a UL OFDMA PPDU, via trigger frames that schedule (a) for data transfer for the STA(s) that the AP already has the knowledge of its/their status (e.g., its/their queue size), as well as (b) for short data, control or management frame transfer for the STAs that the AP does not have such STAs' status information (e.g., the AP does not have any knowledge or recent knowledge of their queue size, or the AP may not know about whether the STAs are in an awake state or not). In one aspect, the AP may assign sub-bands (e.g., wide sub-bands) to respective STAs whose status is known to the AP. The AP may assign sub-bands (e.g., narrow sub-bands) to those STAs whose status is not known to the AP.

A trigger frame is a frame sent by an AP that seeks data, control, or management frame response(s) from one or more STAs that may request to participate in a subsequent UL MU frame. A trigger frame may be in form of, for example, a call-for-uplink (CFU) frame or an assignment-and-trigger (A&T) frame which have some or all of the following features: (a) a list of STAs that an AP seeks a response from; (b) a resource assignment for each STA (e.g., a sub-band assigned to each STA); (c) attributes such as expected MCS for each STA; (d) attributes of the expected UL MU frame, such as the duration, bandwidth, etc.; and/or (e) general indications such as whether the AP seeks a CTS response first followed by a BWR (or ULR) frame or a data frame.

The CFU and A&T frames may have a similar structure and similar properties. However, in one aspect, a CFU frame has a uniform resource assignment (e.g., seeking short responses from the identified or group-identified STAs), whereas an A&T frame likely has a non-uniform resource assignment since the STAs likely have UL data with various sizes to send. In some aspects, some or all of the resources (e.g., sub-bands) are assigned to STAs with reserved identifiers (IDs) which indicate that all or a group of STAs can use that resource. This indication may be referred to as random access or random assignment.

Another example of a trigger frame is an RTS frame with modified receiver addressing (RA). For convenience, this RTS frame may be referred to as a modified RTS frame. In contrast to a legacy RTS frame, the RA field of the modified RTS frame identifies multiple STAs or a group of STAs. The modified RTS frame may have some of the attributes of a CFU/A&T frame. However, unlike a CFU/A&T frame, a modified RTS frame specifically requests CTS responses from the identified STAs. For the sake of brevity, a modified RTS frame may be referred to as an RTS frame in the description below.

A BWR (or ULR) frame may refer to a data, control, or management frame that carries information about the status of the STA (e.g., buffer status, etc.) to its associated AP. A BWR frame may be a frame that carries information about the STA (in addition or in place of information about the channel status of the STA). In addition, a BWR frame may be any control frame, management frame or data frame that carries some or all of the information related to the STA in its MAC header fields, such as the header field(s) in a quality-of-service (QoS) null frame or any data frame with an extended high throughput (HT) control field. These MAC header fields, such as a QoS control field and an extended HT control field, are described in more detail with reference to, for example, FIGS. 17 and 18 and Table 1 below.

FIG. 1 illustrates a schematic diagram of an example of a wireless communication network 100. In the wireless communication network 100, such as a wireless local area network (WLAN), a basic service set (BSS) includes a plurality of wireless communication devices (e.g., WLAN devices). In one aspect, a BSS refers to a set of STAs that can communicate in synchronization, rather than a concept indicating a particular area. In the example, the wireless communication network 100 includes wireless communication devices 111-115, which may be referred to as stations (STAs).

Each of the wireless communication devices 111-115 may include a MAC layer and a physical (PHY) layer according to an IEEE 802.11 standard. In the example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an Ad-hoc networking environment.

An AP STA and a non-AP STA may be collectively called STAs. However, for simplicity of description, in some aspects, only a non-AP STA may be referred to as an STA. An AP may be, for example, a centralized controller, a base station (BS), a node-B, a base transceiver system (BTS), a site controller, a network adapter, a network interface card (NIC), a router, or the like. An non-AP STA (e.g., a client device operable by a user) may be, for example, a device with wireless communication capability, a terminal, a wireless transmit/receive unit (WTRU), a user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

In one or more implementations, OFDMA-based 802.11 technologies are utilized, and for the sake of brevity, an STA refers to a non-AP HE STA, and an AP refers to a HE AP. In one or more aspects, an STA may act as an AP.

Figure 2:
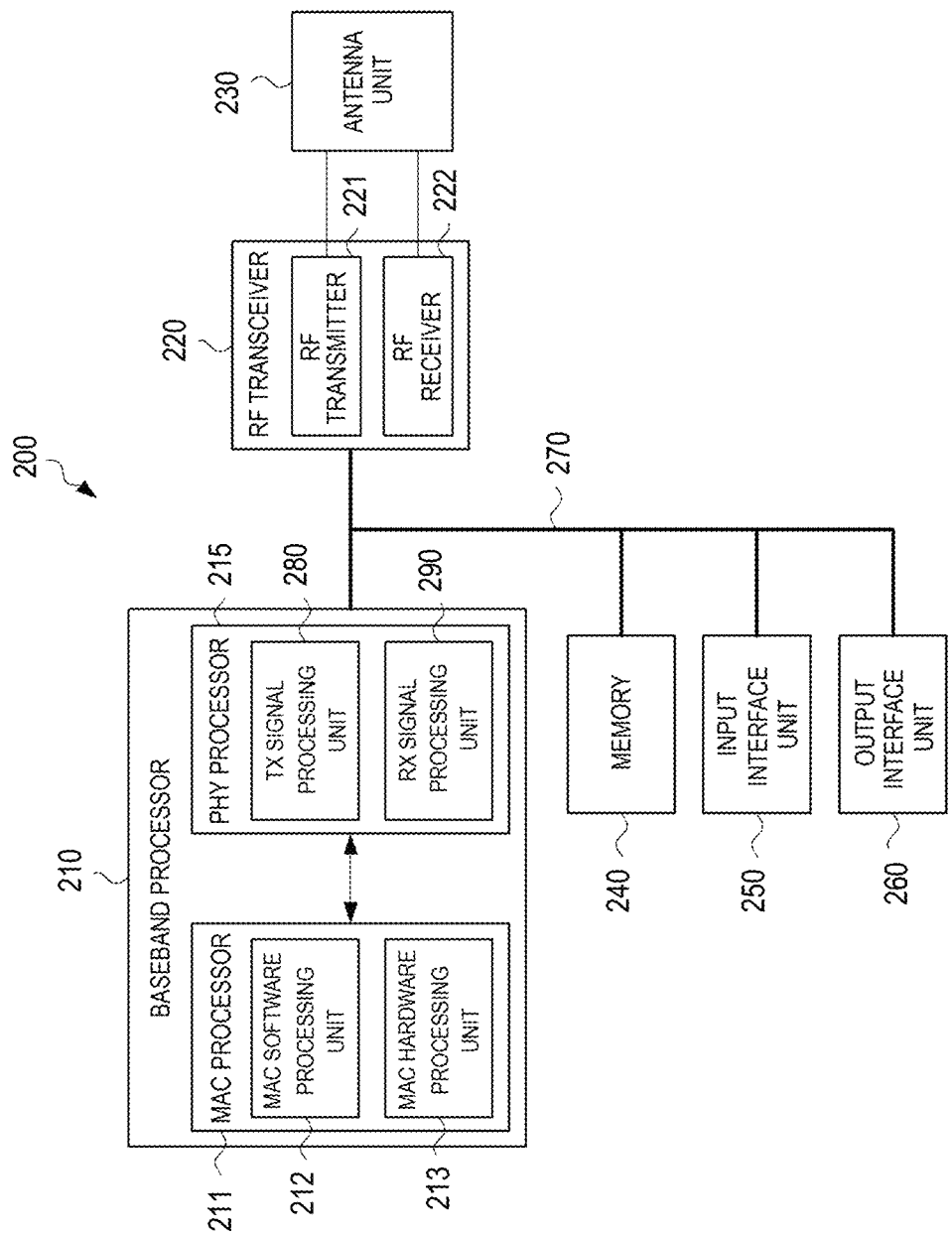
FIG. 2 illustrates a schematic diagram of an example of a wireless communication device.

FIG. 2 illustrates a schematic diagram of an example of a wireless communication device. The wireless communication device 200 includes a baseband processor 210, a radio frequency (RF) transceiver 220, an antenna unit 230, a memory 240, an input interface unit 250, an output interface unit 260, and a bus 270, or subsets and variations thereof. The wireless communication device 200 can be, or can be a part of, any of the wireless communication devices 111-115.

In the example, the baseband processor 210 performs baseband signal processing, and includes a medium access control (MAC) processor 211 and a PHY processor 215. The memory 240 may store software (such as MAC software) including at least some functions of the MAC layer. The memory may further store an operating system and applications.

In the illustration, the MAC processor 211 includes a MAC software processing unit 212 and a MAC hardware processing unit 213. The MAC software processing unit 212 executes the MAC software to implement some functions of the MAC layer, and the MAC hardware processing unit 213 may implement remaining functions of the MAC layer as hardware (MAC hardware). However, the MAC processor 211 may vary in functionality depending on implementation. The PHY processor 215 includes a transmitting (TX) signal processing unit 280 and a receiving (RX) signal processing unit 290. The term TX may refer to transmitting, transmit, transmitted, transmitter or the like. The term RX may refer to receiving, receive, received, receiver or the like.

The PHY processor 215 interfaces to the MAC processor 211 through, among others, transmit vector (TXVECTOR) and receive vector (RXVECTOR) parameters. In one or more aspects, the MAC processor 211 generates and provides TXVECTOR parameters to the PHY processor 215 to supply per-packet transmit parameters. In one or more aspects, the PHY processor 215 generates and provides RXVECTOR parameters to the MAC processor 211 to inform the MAC processor 211 of the received packet parameters.

In some aspects, the wireless communication device 200 includes a read-only memory (ROM) (not shown) or registers (not shown) that store instructions that are needed by one or more of the MAC processor 211, the PHY processor 215 and/or other components of the wireless communication device 200.

In one or more implementations, the wireless communication device 200 includes a permanent storage device (not shown) configured as a read-and-write memory device. The permanent storage device may be a non-volatile memory unit that stores instructions even when the wireless communication device 200 is off. The ROM, registers and the permanent storage device may be part of the baseband processor 210 or be a part of the memory 240. Each of the ROM, the permanent storage device, and the memory 240 may be an example of a memory or a computer-readable medium. A memory may be one or more memories.

The memory 240 may be a read-and-write memory, a read-only memory, a volatile memory, a non-volatile memory, or a combination of some or all of the foregoing. The memory 240 may store instructions that one or more of the MAC processor 211, the PHY processor 215, and/or another component may need at runtime.

The RF transceiver 220 includes an RF transmitter 221 and an RF receiver 222. The input interface unit 250 receives information from a user, and the output interface unit 260 outputs information to the user. The antenna unit 230 includes one or more antennas. When multi-input multi-output (MIMO) or multi-user MIMO (MU-MIMO) is used, the antenna unit 230 may include more than one antenna.

The bus 270 collectively represents all system, peripheral, and chipset buses that communicatively connect the numerous internal components of the wireless communication device 200. In one or more implementations, the bus 270 communicatively connects the baseband processor 210 with the memory 240. From the memory 240, the baseband processor 210 may retrieve instructions to execute and data to process in order to execute the processes of the subject disclosure. The baseband processor 210 can be a single processor, multiple processors, or a multi-core processor in different implementations. The baseband processor 210, the memory 240, the input interface unit 250, and the output interface unit 260 may communicate with each other via the bus 270.

The bus 270 also connects to the input interface unit 250 and the output interface unit 260. The input interface unit 250 enables a user to communicate information and select commands to the wireless communication device 200. Input devices that may be used with the input interface unit 250 may include any acoustic, speech, visual, touch, tactile and/or sensory input device, e.g., a keyboard, a pointing device, a microphone, or a touchscreen. The output interface unit 260 may enable, for example, the display or output of videos, images, audio, and data generated by the wireless communication device 200. Output devices that may be used with the output interface unit 260 may include any visual, auditory, tactile, and/or sensory output device, e.g., printers and display devices or any other device for outputting information. One or more implementations may include devices that function as both input and output devices, such as a touchscreen.

One or more implementations can be realized in part or in whole using a computer-readable medium. In one aspect, a computer-readable medium includes one or more media. In one or more aspects, a computer-readable medium is a tangible computer-readable medium, a computer-readable storage medium, a non-transitory computer-readable medium, a machine-readable medium, a memory, or some combination of the foregoing (e.g., a tangible computer-readable storage medium, or a non-transitory machine-readable storage medium). In one aspect, a computer is a machine. In one aspect, a computer-implemented method is a machine-implemented method.

A computer-readable medium may include storage integrated into a processor and/or storage external to a processor. A computer-readable medium may be a volatile, non-volatile, solid state, optical, magnetic, and/or other suitable storage device, e.g., RAM, ROM, PROM, EPROM, a flash, registers, a hard disk, a removable memory, or a remote storage device.

In one aspect, a computer-readable medium comprises instructions stored therein. In one aspect, a computer-readable medium is encoded with instructions. In one aspect, instructions are executable by one or more processors (e.g., 210, 211, 212, 213, 215, 280, 290) to perform one or more operations or a method. Instructions may include, for example, programs, routines, subroutines, data, data structures, objects, sequences, commands, operations, modules, applications, and/or functions. Those skilled in the art would recognize how to implement the instructions.

A processor (e.g., 210, 211, 212, 213, 215, 280, 290) may be coupled to one or more memories (e.g., one or more external memories such as the memory 240, one or more memories internal to the processor, one or more registers internal or external to the processor, or one or more remote memories outside of the device 200), for example, via one or more wired and/or wireless connections. The coupling may be direct or indirect. In one aspect, a processor includes one or more processors. A processor, including a processing circuitry capable of executing instructions, may read, write, or access a computer-readable medium. A processor may be, for example, an application specific integrated circuit (ASIC), a digital signal processor (DSP), or a field programmable gate array (FPGA).

In one aspect, a processor (e.g., 210, 211, 212, 213, 215, 280, 290) is configured to cause one or more operations of the subject disclosure to occur. In one aspect, a processor is configured to cause an apparatus (e.g., a wireless communication device 200) to perform operations or a method of the subject disclosure. In one or more implementations, a processor configuration involves having a processor coupled to one or more memories. A memory may be internal or external to the processor. Instructions may be in a form of software, hardware or a combination thereof. Software instructions (including data) may be stored in a memory. Hardware instructions may be part of the hardware circuitry components of a processor. When the instructions are executed or processed by one or more processors, (e.g., 210, 211, 212, 213, 215, 280, 290), the one or more processors cause one or more operations of the subject disclosure to occur or cause an apparatus (e.g., a wireless communication device 200) to perform operations or a method of the subject disclosure.

Figure 3A:
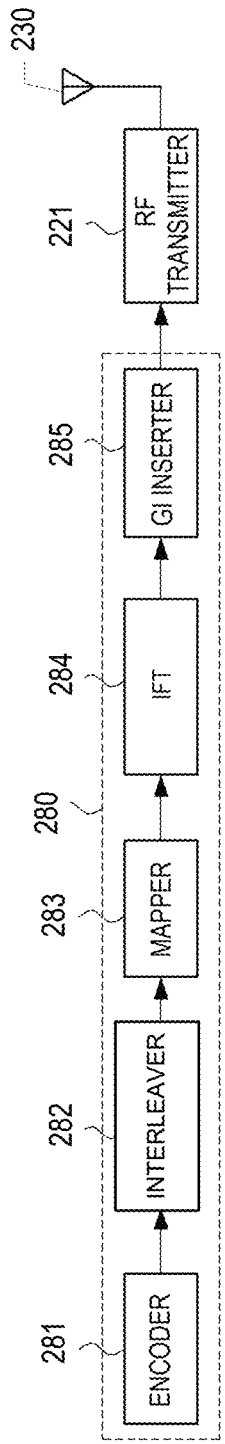
FIG. 3A illustrates a schematic block diagram of an example of a transmitting signal processor in a wireless communication device.

FIG. 3A illustrates a schematic block diagram of an example of a transmitting signal processing unit 280 in a wireless communication device. The transmitting signal processing unit 280 of the PHY processor 215 includes an encoder 281, an interleaver 282, a mapper 283, an inverse Fourier transformer (IFT) 284, and a guard interval (GI) inserter 285.

The encoder 281 encodes input data. For example, the encoder 281 may be a forward error correction (FEC) encoder. The FEC encoder may include a binary convolutional code (BCC) encoder followed by a puncturing device, or may include a low-density parity-check (LDPC) encoder. The interleaver 282 interleaves the bits of each stream output from the encoder 281 to change the order of bits. In one aspect, interleaving may be applied only when BCC encoding is employed. The mapper 283 maps the sequence of bits output from the interleaver 282 into constellation points.

When MIMO or MU-MIMO is employed, the transmitting signal processing unit 280 may use multiple instances of the interleaver 282 and multiple instances of the mapper 283 corresponding to the number of spatial streams ($N_{SS}$). In the example, the transmitting signal processing unit 280 may further include a stream parser for dividing outputs of the BCC encoders or the LDPC encoder into blocks that are sent to different interleavers 282 or mappers 283. The transmitting signal processing unit 280 may further include a space-time block code (STBC) encoder for spreading the constellation points from the number of spatial streams into a number of space-time streams ($N_{STS}$) and a spatial mapper for mapping the space-time streams to transmit chains. The spatial mapper may use direct mapping, spatial expansion, or beamforming depending on implementation. When MU-MIMO is employed, one or more of the blocks before reaching the spatial mapper may be provided for each user.

The IFT 284 converts a block of the constellation points output from the mapper 283 or the spatial mapper into a time domain block (e.g., a symbol) by using an inverse discrete Fourier transform (IDFT) or an inverse fast Fourier transform (IFFT). If the STBC encoder and the spatial mapper are employed, the IFT 284 may be provided for each transmit chain.

When MIMO or MU-MIMO is employed, the transmitting signal processing unit 280 may insert cyclic shift diversities (CSDs) to prevent unintentional beamforming. The CSD insertion may occur before or after the inverse Fourier transform operation. The CSD may be specified per transmit chain or may be specified per space-time stream. Alternatively, the CSD may be applied as a part of the spatial mapper.

The GI inserter 285 prepends a GI to the symbol. The transmitting signal processing unit 280 may optionally perform windowing to smooth edges of each symbol after inserting the GI. The RF transmitter 221 converts the symbols into an RF signal and transmits the RF signal via the antenna unit 230. When MIMO or MU-MIMO is employed, the GI inserter 285 and the RF transmitter 221 may be provided for each transmit chain.

Figure 3B:
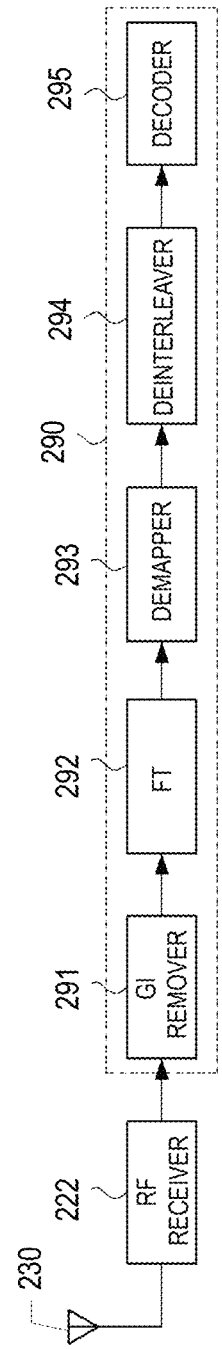
FIG. 3B illustrates a schematic block diagram of an example of a receiving signal processor in a wireless communication device.

FIG. 3B illustrates a schematic block diagram of an example of a receiving signal processing unit 290 in a wireless communication device. The receiving signal processing unit 290 of the PHY processor 215 includes a GI remover 291, a Fourier transformer (FT) 292, a demapper 293, a deinterleaver 294, and a decoder 295.

The RF receiver 222 receives an RF signal via the antenna unit 230 and converts the RF signal into one or more symbols. In some aspects, the GI remover 291 removes the GI from the symbol. When MIMO or MU-MIMO is employed, the RF receiver 222 and the GI remover 291 may be provided for each receive chain.

The FT 292 converts the symbol (e.g., the time domain block) into a block of the constellation points by using a discrete Fourier transform (DFT) or a fast Fourier transform (FFT) depending on implementation. In one or more implementations, the FT 292 is provided for each receive chain.

When MIMO or MU-MIMO is employed, the receiving signal processing unit 290 may be a spatial demapper for converting the Fourier transformed receiver chains to constellation points of the space-time streams, and a STBC decoder (not shown) for despreading the constellation points from the space-time streams into the spatial streams.

The demapper 293 demaps the constellation points output from the FT 292 or the STBC decoder to the bit streams. If the LDPC encoding is used, the demapper 293 may further perform LDPC tone demapping before the constellation demapping. The deinterleaver 294 deinterleaves the bits of each stream output from the demapper 293. In one or more implementations, deinterleaving may be applied only when BCC encoding is used.

When MIMO or MU-MIMO is employed, the receiving signal processing unit 290 may use multiple instances on the demapper 293 and multiple instances of the deinterleaver 294 corresponding to the number of spatial streams. In the example, the receiving signal processing unit 290 may further include a stream deparser for combining the streams output from the deinterleavers 294.

The decoder 295 decodes the streams output from the deinterleaver 294 and/or the stream deparser. For example, the decoder 295 may be an FEC decoder. The FEC decoder may include a BCC decoder or an LDPC decoder.

Figure 4:
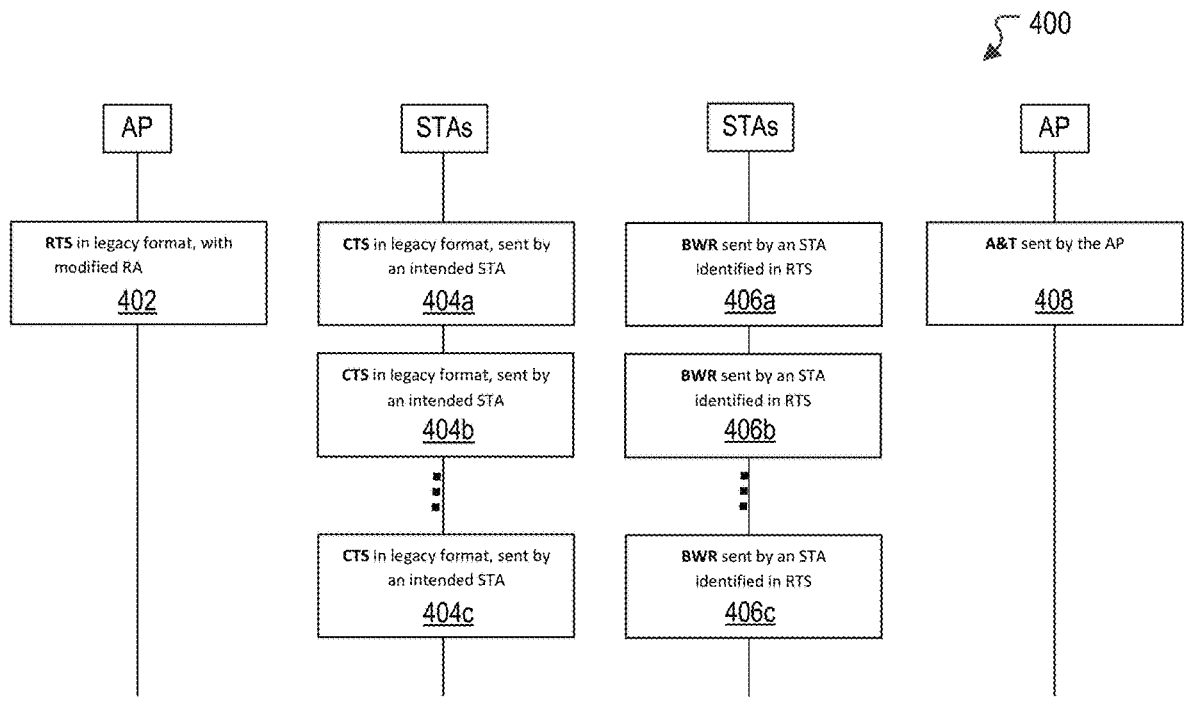
FIG. 4 illustrates a schematic diagram of an example of an exchange of trigger and response frames among wireless communication devices.

FIG. 4 illustrates a schematic diagram of an example of an exchange 400 of trigger and response frames among wireless communication devices. The exchange 400 includes exchanges of an RTS frame 402, CTS frames 404a-404c, BWR frames 406a-406c and an AT&T frame 408. After receiving an RTS frame 402, which is in legacy PPDU format with a modified RA field, the intended next-generation STAs respond with uplink frames, such as CTS frames 404a-404c in legacy format, followed by uplink frames that represent BWR frames 406a-406c. A BWR frame is in a non-legacy PPDU format. In one aspect, a time period between the frames is a short interframe space (SIFS). For example, a time period between an RTS frame and CTS frames is SIFS, a time period between CTS frames and BWR frames is SIFS, and a time period between BWR frames and an AT&T frame is SIFS. Thus, the STAs can transmit their respective CTS frames simultaneously (e.g., after SIFS) and transmit their respective BWR frames simultaneously (e.g., after SIFS). Unintended STAs, whether next-generation STAs or legacy STAs, listen to the RTS/CTS exchange followed by an IEEE 802.11 frame and defer properly. Note that it is possible that some of the intended STAs may not respond to an RTS frame 402. After the BWR frames 406a-406c are sent by some or all of the intended STAs, the AP sends an A&T frame 408 that triggers UL multiuser transmission and has proper information to inform the participating STAs where and how to place their PPDU in the UL multiuser PPDU frame.

As shown in FIG. 4, the AP first sends the RTS frame 402 in a legacy format that is understood by legacy and next-generation STAs. However, the RTS frame 402 uses a special coding in an RA field such that multiple STAs can be addressed at the same time. The RA field may be populated in forms of using one or more group identifier (GID) fields or any other group-addressing identification inside the RA field such that with a single identifier a set of STAs, instead of a single STA, are identified and those STAs as a result can respond to the frame sent by the AP. Some group-identifiers may identify a large set of STAs such as all STAs associated to the AP.

When a STA receives a legacy RTS frame 402 with a modified RA field, the STA compares the modified RA field with its own MAC address associated with the STA. If the modified RA field has the MAC address of the STA, then the STA responds to the legacy RTS frame 402. For example, the STA responds to the legacy RTS frame 402 with a legacy CTS frame 404a. In one or more implementations, if the modified RA field, or a portion thereof, does not match the MAC address of the STA, then the STA compares the group-identification(s) or GID(s) associated with the STA against the modified RA field. If a match is determined, then the STA responds with a legacy CTS frame 404a, for example, after a predetermined time period (e.g., SIFS). In one or more implementations, multiple STAs are addressed by the AP via the RTS frame 402; hence, multiple STAs send legacy CTS frames 404a-404c. Note that in legacy CTS frames, the content of the legacy CTS frames are the same since only the MAC address of the destination node (e.g., the AP) would appear in a MAC header. However, additional rules may be employed so that the bit-level data is the same for all of the CTS frames. In one aspect, the scrambling code employed by each STA is the same scrambling code as employed in the RTS frame 402, or it can be any fixed scrambling code.

In one aspect, when a legacy STA receives a RTS frame with a modified RA field, the legacy STA does not know that the RA has a redefined meaning, and the legacy STA simply compares the content of the modified RA field with its own MAC address and if these two addresses do not match, then the STA processes the RTS frame according to the existing IEEE 802.11 specification. While it is not impossible, it is unlikely that the RA field matches the MAC address of a legacy STA that is associated with the same AP. In this case, the AP would need to take an action.

As shown in FIG. 4, the RTS/CTS frame exchange between the AP and STAs is followed by uplink frames sent by participating STAs in a format that offers orthogonal domains to different STAs even if the STAs send their frames at the same time. This mechanism of sending uplink frames from multiple sources to a common destination at the same time may be performed by employing orthogonal coding concepts and various families of orthogonal codes. Alternatively, the mechanism of sending uplink frames simultaneously from multiple sources may be performed using a UL OFDMA format. In some aspects, the CTS frames may be sent in the same sub-bands and may be combined over the air such that the individual CTS frames are indistinguishable to the AP.

In addition to a CTS frame (e.g., 404a), a next-generation STA may respond to the RTS frame 402 after the predetermined period by sending a BWR frame (e.g., 406a) that is encoded with an orthogonal-coding format. By employing orthogonal coding, the AP can determine which of the intended STAs initially responded with a CTS frame. For example, by using the decoding procedure for orthogonal codes where a specific orthogonal code is assigned a priori to the associated STAs, or individually assigned to each STA within a given GID (e.g., a fixed orthogonal code is assigned to a first STA, a second STA, and other STAs within any GID). Additionally, using information contained within the BWR frames, the AP determines the size of the payload that each participating STA has to send in the upcoming MU UL frame. For example, each STA announces within an associated BWR frame how many bytes is the total size of the associated UL data, and/or which MCS the STA prefers to use in upcoming UL MU frame, and/or which spatial stream (SS) the STA prefers to use in upcoming UL MU frame, and an AP can determine the size of the resource (e.g., number of sub-bands) that each STA is requesting. The AP can then take action in sending a trigger frame in form of an A&T frame 408 (with no restriction in PPDU format) to the participating STAs. Note that unintended STAs, whether next-generation STAs or legacy STAs, that are in the neighborhood of one of the intended STAs would receive the RTS and CTS frame exchange as a legacy RTS/CTS followed by other frames and would defer properly.

Figure 5:
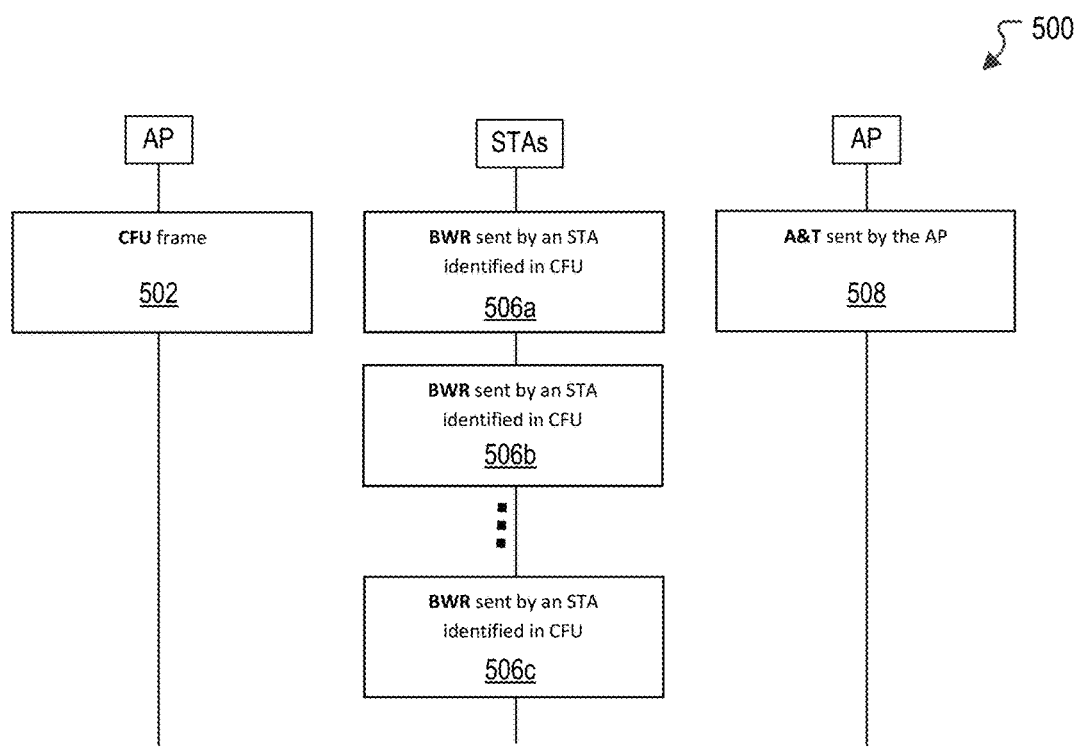
FIG. 5 illustrates a schematic diagram of another example of an exchange of trigger and response frames among wireless communication devices.

FIG. 5 illustrates a schematic diagram of another example of an exchange 500 of trigger and response frames among wireless communication devices. The exchange 500 includes exchanges of a trigger frame in the form of a CFU frame 502, BWR frames 506a-506c and a trigger frame in the form of an A&T frame 508. In this exchange 500, the AP first sends a CFU frame 502 with a group-addressed RA to the intended next-generation STAs. In turn, some or all of the intended STAs respond to the CFU frame 502 with BWR frames 506a-506c, after which the AP sends an A&T frame 508. In this case, the A&T frame 508 triggers multiuser UL transmission and provides a UL multiuser assignment. In some embodiments, the second trigger frame, the A&T frame, may address a subset of the STAs listed in the first trigger frame. In some embodiments, an AP may send a first trigger frame, a CFU frame, to a first set of STAs and then send another trigger frame in form of CFU to a second set of STAs and then send a second trigger frame, in form of A&T frame, to a set of STAs that have subsets from the first and second set of STAs. In some practical situations, there may not be an uplink response to the first trigger frame (in the form of a CFU) in which case the AP sends another first trigger frame, in the form of a CFU, to a new set of STAs (that may be addressed to some of the STAs that were addressed in the first CFU frame).

In contrast to FIG. 4, the exchange 500 shows a simpler exchange of frames, where only the a trigger frame in the form of a CFU frame 502, the BWR frames 506a-506c, and a trigger frame in form of an A&T frame 508 are exchanged between the AP and the STAs. In one or more implementations, the AP performs some protection mechanism (either in the form of an RTS/CTS exchange, or in other form) prior to sending the CFU frame 502; hence, only the bandwidth request procedure is performed thereafter. In some implementations, the CFU frame 502 is not a legacy frame; hence, the CFU frame 502 may be sent in any form that the AP finds efficient, such as an OFDMA PPDU. The exchange of the BWR frames 506a-506c and the A&T frame 508 are the same as those described with respect to FIG. 4.

In some aspects, the BWR frame (e.g., 506a) is sent with a PPDU that uses an orthogonal-coding format. In the orthogonal-coding format, each STA may be assigned a unique code or set of codes at the time of association. In this respect, the AP would use all the allocated codes to decode the received BWR frame(s) (e.g., 506a) in order to determine which STA(s) have sent the BWR frame(s).

In one or more implementations, the BWR frames 506a-506c sent by multiple STAs are encoded using OFDMA. For instance, consider an OFDMA PPDU structure where a set of adjacent tones for the entire frame time duration is assigned to a STA. Such tone assignment may be referred to as a sub-band or adjacent tone assignment (ATA). For instance, the payload section of a PPDU may include four sub-bands or ATAs where each is assigned to an STA (see FIG. 6). However, the number of sub-bands may depend on a minimum bandwidth for a sub-band. In some aspects, two or more sub-bands in the payload section are joined to form wider sub-bands and are assigned to an STA by the AP intended for a DL OFDMA or a UL OFDMA transmission. Hence, the total number of sub-bands in an OFDMA PPDU may vary based on the minimum width of each sub-band. For a BWR frame (e.g., 406a), the AP assigns a sub-band (or ATA) to an STA (or in some cases to a set of STAs) that are expected to send an associated BWR frame (e.g., 406a). In this regard, the STAs would place the constructed PPDU within the pre-assigned sub-band.

A BWR frame (e.g., 406a, 506a) may contain vital information regarding the operation of each STA such as: (a) the buffer status of the STA; (b) the buffer status of the STA per access category (AC) or per Traffic Identifier (TID); and/or (c) MCS that the STA is intending to employ in a next data transmission. With regard to the MCS, the MCS may vary depending on the sub-band; hence, the STA may list a set of MCS for each assigned sub-band. Alternatively, the STA may request a minimum time duration from the AP for its subsequent participation in a UL OFDMA PPDU (scaled for a unit bandwidth).

In some aspects, the CFU frame 502 and the A&T frame 508 may follow a similar structure as one another. In general, the CFU frame 502 and the A&T frame 508 may be in the form of a trigger frame. In this example, either of these frames sent by an AP causes a response frame from the STAs that have been indicated in the sent trigger frame.

In one or more implementations, a response to a trigger frame in the form of an A&T frame 508 transmission is a data frame sent by a STA where some of the attributes of the data frame follows the attributes indicated by the AP in the A&T frame 508. For instance, the AP announces one or more sub-bands assigned to a STA. In this respect, the STA follows the assignment and places an associated PPDU in the assigned sub-band(s). In addition, the AP may indicate the MCS and other PHY attributes in the A&T frame 508, such as short/long guard interval (GI) values, etc., that the AP expects the STA to use in preparation of data for an associated PPDU. In some aspects, the STA follows the same specified PHY attributes as indicated in the A&T frame 508.

In one or more implementations, the AP may not receive a BWR frame from any of the STAs, in which case the AP would need to take control of the medium after a time period (e.g., a point interframe space (PIFS) time period). What the AP does after the time period depends on the AP operation. For example, the AP may resend the CFU frame 502 (or the same trigger frame) to the same set of STAs in case the AP assesses that the earlier (or previous) CFU frame 502 (or the trigger frame) may have unintentionally collided with one or more other frames. In another example, the AP may send a new CFU frame 502 (or a new trigger frame) to another set of STAs, and determine whether the STAs have any payload and the size of payload to send. In another example, the AP may send single-user (SU) PPDUs to some of the STAs, or the AP may send MU PPDUs to a set of STAs.

In one or more implementations, the AP may not receive an expected number of BWR frames from the STAs in response to a trigger frame in the form of a CFU frame. For example, only one or two of the STAs (instead of all of the intended STAs) respond to the CFU frame. In this regard, the AP has multiple options on how to proceed. One option is that the AP sends a trigger frame in the form of an A&T frame for the few STAs that responded with BWR frames. Another option is that the AP avoids sending an A&T frame, and instead sends a second a trigger frame in the form of a CFU frame to a second set of STAs. In this example, after receiving BWR frames from all or some of the second set of STAs, the AP may then send a trigger frame in the form of an A&T frame to the STAs that responded to the first CFU frame and to all the STAs that have responded to the second CFU frame. Even after sending the second CFU frame, if the AP still does not receive a sufficient (or expected) number of BWR frames, then the AP may send a third CFU frame. After receiving some BWR frames (e.g., greater than a threshold number of BWR frames), the AP may send a fourth CFU frame, or the AP may send an A&T frame to all STAs that responded to the first CFU frame, the second CFU frame and the third CFU frame.

The assignment of sub-bands to each STA or set of STAs is announced within either an RTS frame (e.g., 402 in FIG. 4) or a CFU frame (e.g., 502 FIG. 5). For example, the AP may send the RTS frame to a given set of STAs that are listed within an RA field of the RTS frame. In some aspects, the RA field includes one or more group-identifications (GIDs). In this respect, the STAs a priori determines which sub-band (or ATA) of the payload to use for BWR assignment based on a corresponding order in the GID. For example, the RTS frame announces a GID1, where the GID1 identifies a set (or grouping) of STAs in the following order: STA-A, STA-B, STA-C, and STA-D. Given the inherent priority within the GID1, and given a sub-band (or an ATA) assignment that is a priori known by all STAs according to an AP announcement either in a beacon frame or during association, the STA-A knows which sub-bands are assigned to the first slot (or location) in the GID1. Similarly, STA-B knows which sub-bands are assigned to the second slot in the GID1, etc. In this regard, the allocation of the sub-bands may be inherently known given a known GID. In some embodiments, a group-identification may be over-loaded in the sense that the group identifier is assigned to more STAs that it is nominally designed. For instance, the AP may assign the first position of GID1 to several STAs and so on. Such overloading causes multiple STAs to be identified with a given GID and a given position with the GID. This means that when the AP places an overloaded GID in a trigger frame, multiple STAs are allowed to access the assigned resource.

For efficiency concerns, the AP may announce multiple GIDs within the same RTS frame (e.g., 402), or the same CFU frame (e.g., 502). In this case, the order of the GIDs may be inherently known by the STAs (e.g., GID-A has a first order, and GID-B has a second order, or the like). The inherent order of the GIDs combined with the inherent order of the STAs within a GID, may be used to uniquely identify the order of all the STAs that are identified by the set of GIDs. In addition, the unique order of the STAs may be used to assign ATA areas (or sub-band locations) a priori to all the STAs. In some aspects, the AP changes the number of tones within the ATA areas based on the total number of GIDs and STAs that are expected to respond. In this regard, the ATA areas may be relatively narrower (or smaller number of tones) if there are more GIDs and more STAs expected to respond within a given uplink bandwidth.

In the case of a trigger frame in form of a CFU frame (e.g., 502), the response may not be a data frame but rather a control frame or management frame that has part or all of the content for a BWR frame (e.g., 506). The CFU frame, however, contains a list of STAs that are identified by an association ID (AID), a partial AID (PAID), a GID, or any other short format of the AID. For each STA that is identified in the CFU frame there would be a sub-band assigned for that STA. For example, the CFU frame may include an index of the sub-band in association with an ID of the STA.

In one or more implementations, the list of STAs and sub-band IDs in a trigger frame, whether in form of an A&T or CFU frame, are organized as follows: (STA1_ID, SID1), (STA2_ID, SID2), (STA3_ID, SID3), etc., where STA_ID refers to the identification of the STA by the AP using AID, PAID, or the like, and SID refers to the sub-band ID. In some aspects, the announcement of the STA-IDs may be in the order of the sub-bands such as an a priori known order (e.g., low to high frequency sub-bands). In this respect, the sequence may include: STA1_ID, STA2_ID, STA3, STA4, ID, etc., in which the sequence defines that the STA1 is assigned to a first sub-band in the order, the STA2 is assigned to a second sub-band in the order, the STA3 is assigned to a third sub-band in the order, and the like. In some implementations, if the AP determines to bypass the assignment of a specific STA to a sub-band, the AP may assign a placeholder ID such as an all-zero ID or an all-one ID that would indicate all or a subset of associated STAs.

In one or more implementations, the AP may use a group identification where by announcing such ID, a set of STAs are identified and such STAs would know their respective order within the group identification. The sequence of information announced by the AP may include: (GID1, SID11, SID12, SID13, SID14), (GID2, SID21, SID22, SID23, SID24), (GID3, SID31, SID32, SID33, SID34), etc. The sequence defines that all of the STAs that are identified by the GID1 may use the sub-bands SID11, SID12, SID13, SID14. In this regard, an STA placed in the first order is assigned to SID11 and a second STA placed in the second order is assigned to SID12, etc. In other implementations, the AP announces the sub-band assignments for a subset of members in a GID where the GID includes a relatively large membership of STAs. In still other implementations, the AP may announce a group identification but only assigns a small number of sub-band IDs (e.g., the number of sub-bands available is smaller than the number of STAs included in the group) where each of the members of the group is allowed to select one of the assigned sub-bands. In such embodiment, due to a smaller number of assigned resources in comparison to the set of STAs, each STA accesses one of the assigned resources randomly, hence such embodiment may be referred to as random access. For example, the group identification may have four members, but the AP announces only one sub-band available for all of the members. In this case, multiple STAs of the same group may attempt to place an associated PPDU in the assigned sub-band. In some embodiments, the STAs that are identified by a group-identifier may use some internal counters and based on the value of such counter a STA is allowed to access a sub-band that is assigned to the group-identified STAs. However, this scenario may cause collisions among the PPDU transmissions, and may then cause the AP not to receive the ULR from one or more of the STAs. In this respect, the AP may determine a trade-off metric by determining an efficiency metric for a ULR process in a group and determining a probability metric based on a likelihood of collisions occurring if the number of stations in the group is greater than the number of sub-bands available for uplink transmission.

In case that the AP decides to enhance the performance of the STAs that are expected to send their data frames with more than one spatial stream, the AP may add one or more HE LTF symbols or a HE null data packet (NDP) frame. In one or more implementations, the AP adds a maximum number of HE LTF symbols (equal to a maximum number of spatial streams that the AP supports as a receiver) to the CFU frame (e.g., 502 in FIG. 5). In some aspects, the CFU frame is sent with one spatial stream; however, the AP may add multiple HE LTF symbols to enhance the multiple spatial stream transmission that each STA performs. In this case, the AP may identify a number of HE LTF symbols in HE SIG-A or HE SIG-B symbols in the CFU frame (and may even further identify whether the HE LTF symbols have short durations, e.g., compressed or not). The identification of the number of LTF symbols is carried in a header field referred to as Number_LTF which is carried in the HE SIG-A field in some implementations, or carried in the HE SIG-B in other implementations.

In one aspect, the AP may send a separate HE NDP frame or a very-high throughput (VHT) NDP frame first, and then after a SIFS or a PIFS time interval, the AP sends the trigger frame in form of a CFU frame (e.g., 502). In another embodiment, the AP first sends a CFU frame, and after a SIFS or PIFS time interval, the AP sends a separate HE NDP frame or VHT NDP frame. In this example, the STAs expect the NDP frame after the CFU frame; hence, the STAs begin sending the BWR frames after a SIFS time interval after receiving the NDP frame. In one or more implementations, the AP first sends a CFU frame and expects to receive BWR frames in return. The AP then sends the A&T frame. After a SIFS or PIFS time interval, the AP sends a separate HE NDP frame or VHT NDP frame. In this example, the STAs expect the NDP frame after the AT&T frame; hence, the STAs begin generating (or populating) a UL MU PPDU frame after a SIFS time interval after receiving the NDP frame. The STAs may be participating in a UL MU MIMO PPDU, or may be participating in a UL OFDMA PPDU depending on implementation.

In one or more implementations, the NDP frame includes one or more of the following properties, and one or more of the following TXVECTOR parameters are used for the NDP frame: (a) FORMAT set to VHT or HE; (b) N_TX set to the maximum number of transmit chains the HE beamformer supports; (c) FEC_CODING set to BCC_CODING or LDPC_CODING; (d) APEP_LENGTH set to 0; (e) GI_TYPE set to SHORT_GI if the HE beamformer is supported; otherwise set to LONG GI or other GI that the HE format supports; (f) MCS set to the maximum MCS that the HE beamformer supports for the maximum NSS supported; (g) BEAMFORMED set to 1; (h) NUM_USERS set to 1; (i) NUM_STS indicates the maximum number of space-time streams that the HE beamformer supports according to supported VHT-MCS and NSS Set field or the supported HE-MCS and NSS Set field in VHT Capabilities or HE Capabilities; and (j) CH_BANDWIDTH set to the same value as the TXVECTOR parameter CH_BANDWIDTH in the preceding VHT NDP Announcement frame or HE NDP Announcement frame.

Figure 6:
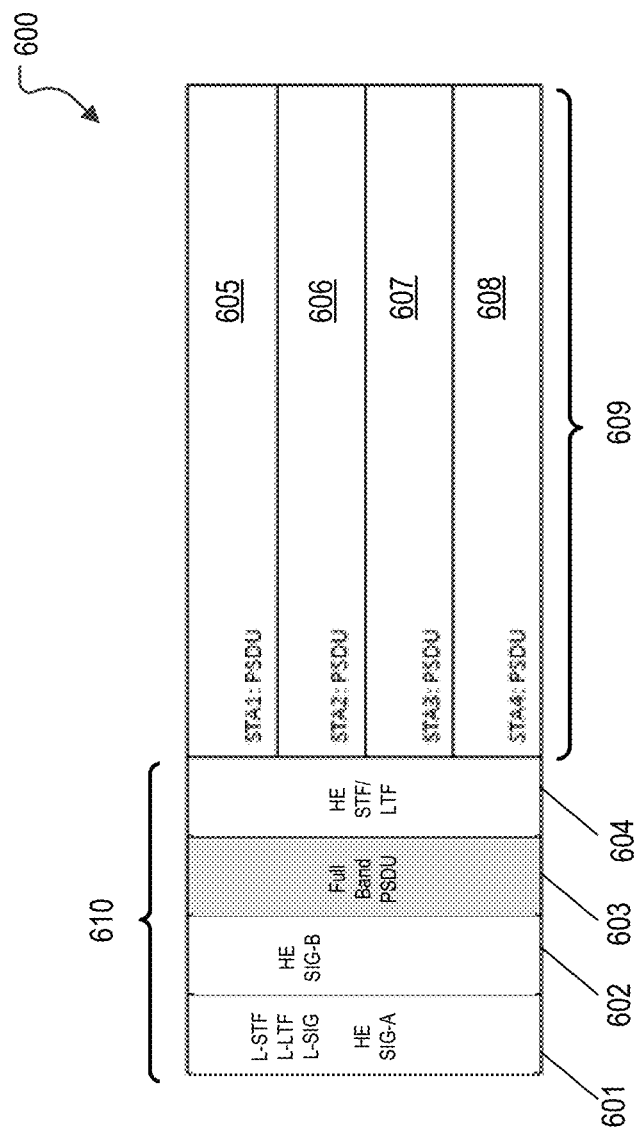
FIG. 6 illustrates a schematic diagram of an example of a downlink frame.

FIG. 6 illustrates a schematic diagram of an example of a downlink (DL) frame 600. In one aspect of the disclosure below, a DL frame refers to a DL OFDMA frame, a HE DL OFDMA frame, a DL OFDMA PPDU, a HE DL OFDMA PPDU, a DL PPDU, a DL MU PPDU or vice versa. In one aspect, a PPDU may be a downlink frame or an uplink frame. In one aspect, a DL OFDMA PPDU (e.g., 600) includes a header (e.g., 610) and a payload (e.g., 609). In one aspect, a DL frame 600 is a trigger frame, such as a CFU frame or an A&T frame.

In one or more aspects, an AP sends a DL OFDMA frame (e.g., 600) in a HE PPDU format to a set of STAs. In one aspect, a baseband processor 210 (e.g., a PHY processor 215 or a TX signal processing unit 280) generates a DL frame and its components shown in FIG. 6 and causes transmission of the DL frame.

In FIG. 6, the horizontal dimension represents the time dimension or number of OFDM symbols, whereas the vertical dimension represents the frequency dimension, number of tones, or number of sub-carriers. Note that for a given FFT size, the number of tones is given, however, depending on the sub-carrier spacing, two OFDM symbols with e.g., FFT=64 and FFT=256 would occupy the same bandwidth. In one or more implementations of the present disclosure, a sub-band refers to a set of contiguous tones or subcarriers that as a whole are assigned for a payload whose expected destination is a single STA, or a set of STAs. In one or more implementations, a sub-band is a horizontal partition of an OFDMA PPDU or frame where a set of contiguous tones for a contiguous set of OFDM symbols are designated for a given payload whose expected destination is an STA or a set of STAs.

A DL OFDMA PPDU has a predetermined channel bandwidth, e.g., 20 MHz, 40 MHz, 80 MHz, 160 MHz, or 80+80 MHz (i.e., two 80 MHz). A sub-band is a portion of the channel bandwidth of a DL OFDMA PPDU. For example, when the bandwidth of a DL OFDMA PPDU is 20 MHz, and there are four STAs, each of the sub-bands associated with a respective one of the STAs is 5 MHz in bandwidth. When the bandwidth is 40 MHz, each of the four sub-bands associated with a respective one of the four STAs may be 10 MHz in bandwidth. When the bandwidth is 80 MHz, each of the four sub-bands associated with a respective one of the four STAs may be 20 MHz in bandwidth. These are merely examples, and the present disclosure is not limited to these examples. A bandwidth (e.g., 20 MHz, 40 MHz, 80 MHz, 160 MHz, or 80+80 MHz) of a DL OFDMA PPDU may be referred to as a DL bandwidth, a DL PPDU bandwidth, a DL channel bandwidth, or an overall DL bandwidth. A bandwidth (e.g., 20 MHz, 40 MHz, 80 MHz, 160 MHz, or 80+80 MHz) of a UL OFDMA PPDU may be referred to as a UL bandwidth, a UL PPDU bandwidth, a UL channel bandwidth, or an overall UL bandwidth. A channel bandwidth, an overall bandwidth, or an entire bandwidth may refer to a DL bandwidth or a UL bandwidth.

Referring to FIG. 6, the header 610 of the DL frame 600 includes a legacy header, which is comprised of a legacy short training field (L-STF), a legacy long training field (L-LTF) and a legacy signal (L-SIG) field (see, e.g., portions of 601). The legacy header contains several symbols based on an early design of an IEEE 802.11 specification. Presence of these symbols would make any new design compatible with the legacy designs and products. In one or more implementations, the legacy STF, LTF and SIG symbols are modulated/carried with FFT size of 64 on a 20 MHz sub-channel and are duplicated every 20 MHz if the DL OFDMA PPDU has a bandwidth wider than 20 MHz. Therefore, the legacy field (i.e., the STF, LTF, and SIG fields) occupies the entire channel bandwidth of the DL frame.

In one or more aspects, the header 610 includes a HE SIG-A field (e.g., a portion of 601) and a HE SIG-B field (e.g., 602). These fields contain symbols that carry control information that may be vital regarding each PLCP service data unit (PSDU) and regarding the radio frequency (RF), PHY and MAC properties of the PPDU. Several fields may be located either in HE SIG-A and/or HE SIG-B. The HE SIG-A and HE SIG-B symbols can be carried/modulated using FFT size of 64 or 256 depending on implementation. The HE SIG-A and HE SIG-B fields may occupy the entire channel bandwidth of the DL frame. In some aspects, the HE SIG-B is not always present in all UL OFDMA PPDUs.

The header 610 may further include HE STF and HE LTF fields (e.g., 604), which contain symbols used to perform necessary RF and PHY processing for each PSDU and/or for the whole PPDU. Depending on whether the HE STF/LTF symbols are beamformed, there may be two sets of such symbols. The HE STF/LTF symbols 604 may be modulated/carried with FFT size of 256 and modulated over the entire bandwidth of the DL frame 600. Thus, the HE STF/LTF fields may occupy the entire channel bandwidth of the DL frame.

The header 610 of the DL frame 600 may include a full-band transmission region, referred to as a full-band PSDU 603 for unicast or broadcast/multicast PSDU(s), which exist for DL OFDMA PPDUs. In one aspect, the full-band PSDU 603 is an optional region in the DL OFDMA PPDU 600. The full-band PSDU 603 may have a variable length. The full-band PSDU 603 is a region having a set of symbols that covers the whole bandwidth of the PPDU but across several OFDM symbols before the start of the sub-band region where each one or multiple sub-bands are assigned to an STA or a set of STAs. In one aspect, if the full-band PSDU 603 is present in the PPDU (e.g., as a part of the header 610), a set of HE STF and/or HE LTF symbols appear before the full-band PSDU 603 in the PPDU, where the HE STF/LTF symbols are not beamformed. In some aspects, the full-band PSDU 603 can be carried/modulated using FFT size of 64 or 256 depending on implementation. For example, the full-band PSDU 603 may be carried/modulated using FFT size of 64 as SIG-A, or carried/modulated using FFT size of 256 as the sub-band PSDU(s) region. The full-band PSDU 603 may occupy the entire channel bandwidth of the DL frame.

In one aspect, a header is referred to as a preamble header, a preamble, a header section, or vice versa. For the sake of brevity, a header may refer to a component of a header. Thus, in one aspect, a header may refer to one or more headers (e.g., 601, 602, 603, and/or 604). In one aspect, a header is associated with the channel bandwidth of a PPDU. In one example, for a given bandwidth (e.g., 80 MHz) of a PPDU, a header is modulated on the entire bandwidth of the PPDU (e.g., entire 80 MHz). In another example, a header is modulated on a sub-channel (e.g., 20 MHz sub-channel) of the bandwidth (e.g., 80 MHz) and the modulated signal is duplicated on each of the remaining sub-channels (e.g., remaining three 20 MHz sub-channels) of the bandwidth so that the header may occupy the entire channel bandwidth.

In FIG. 6, the payload section 609 includes payloads (e.g., PSDUs) assigned to multiple STAs, and is modulated using an FFT size of 256. In this regard, the payloads are associated with STA1, STA2, STA3, and STA4. For example, the PSDU payload 605 is associated with STA1, the PSDU payload 606 is associated with STA2, the PSDU payload 607 is associated with STA3, and the PSDU payload 608 is associated with STA4. The AP transmits the payloads through sub-bands of possibly varying bandwidth, and possibly non-contiguous sub-bands for STAs. In one aspect, each set of sub-bands is associated with its respective PSDU. In one aspect, each set of sub-bands is associated with its respective STA. In one aspect, a set of sub-bands may include one or more sub-bands. In one aspect, a sub-band may include one or more sub-bands. In one example, the number of assigned sets of sub-bands may be the same as the number of STAs associated with the AP. In FIG. 6, the sub-bands assigned to STA1, STA2, STA3, and STA4 have equal bandwidth and the sub-bands are contiguous. For example, the bandwidth of the DL frame may be (a) 20 MHz where each of the sub-bands has a 5 MHz bandwidth, (b) 40 MHz where each of the sub-bands has a 10 MHz bandwidth, or (c) 80 MHz where each of the sub-bands has a 20 MHz bandwidth. However, the procedure described in the present disclosure does not require contiguous or equal bandwidth for sets of assigned sub-bands.

A PSDU for downlink (e.g., each of 605, 606, 607, and 608) is associated with a sub-band of the channel bandwidth of the DL PPDU (e.g., 600) and is modulated using the sub-band rather than the entire channel bandwidth of the DL PPDU. In one aspect, the modulation involves inverse Fourier transformation performed, for example, by an inverse Fourier transformer 284 in FIG. 3A.

In one or more aspects, the bandwidth assigned to payloads (e.g., 605, 606, 607 and 608) to STAs depend on, for example, the payload size and the MCS and number of spatial streams that the AP decides for the sub-band transmission, and the overall consideration that the AP need to make to approximately align the length/duration of various PSDU sub-bands.

In one or more implementations, each PSDU contains a payload directed to an STA including corresponding MAC/PHY padding. The broadcast PSDU(s), located in the full-band PSDU 603, are intended for all the STAs that are associated with the AP. The presence and length of such PSDU(s) are indicated in the HE SIG-A field (see, e.g., a portion of 601) and/or the HE SIG-B field 602. The multicast PSDU(s), located in the full-band PSDU 603, are intended for a set of STAs that are associated with the AP. The presence and length of such PSDU(s) and the set of STAs that each multicast PSDU is destined to is indicated in the HE SIG-A field and/or the HE SIG-B field. The unicast PSDU(s), typically located in the sub-band region of a PPDU (e.g., in the payload 609), are destined to an STA that is associated with the AP. The presence and length of a PSDU in a sub-band or a set of sub-bands and the STA that is a recipient of the unicast PSDU are indicated in the HE SIG-A field and/or the HE SIG-B field. In one aspect, one or more of unicast PSDU(s) may be located in the full-band PSDU 603.

Figure 7:
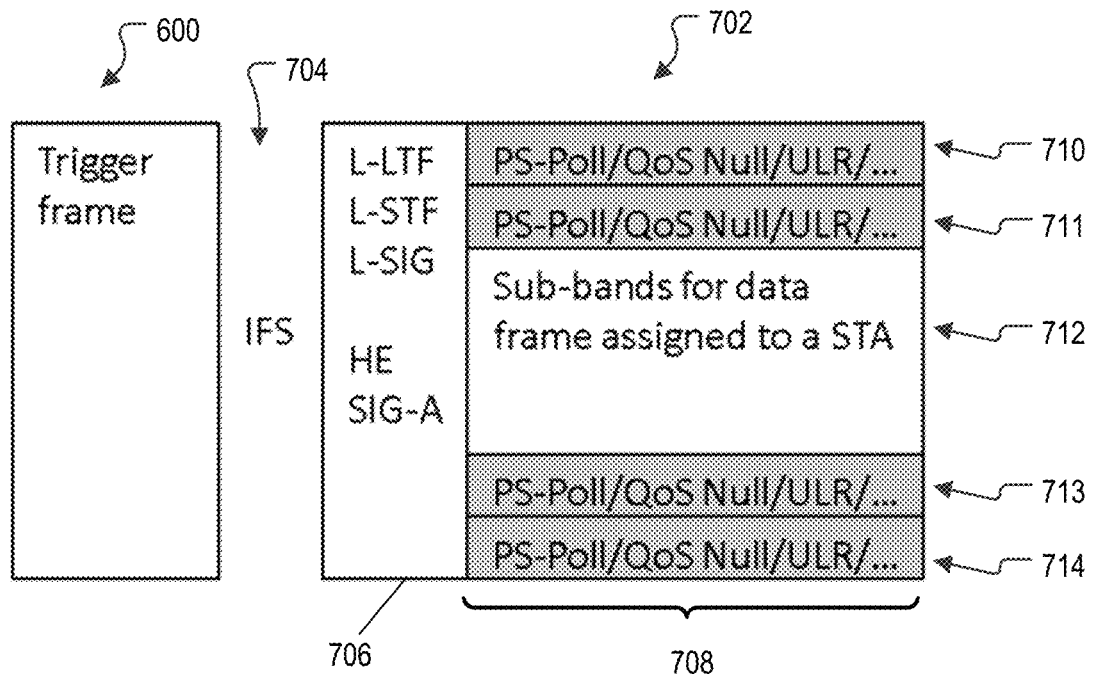
FIG. 7 illustrates a schematic diagram of an example of a downlink frame and an uplink frame with an illustration of sub-bands.

FIG. 7 illustrates a schematic diagram of an example of a downlink frame 600 and an uplink frame 702 with an illustration of sub-bands. In one aspect, an uplink frame may refer to a UL OFDMA frame, a HE UL OFDMA frame, a UL OFDMA PPDU, a HE UL OFDMA PPDU, a UL PPDU, a UL MU PPDU, or vice versa. In one aspect, a PPDU refers to a HE PPDU or an OFDMA PPDU. In one aspect, a PPDU is a downlink frame (e.g., 600) or an uplink frame (e.g., 702). The uplink frame 702 includes a header 706 and a payload 708.

In one or more aspects, an AP sends a DL OFDMA frame (e.g., 600) to a set of STAs. After a predetermined time period (e.g., IFS or SIFS) after the receipt of the DL OFDMA frame, each STA of the same set of the STAs or each STA of a subset of the STAs replies with an individual uplink frame. In one aspect, a baseband processor 210 (e.g., a PHY processor 215 or a TX signal processing unit 280) generates the frames and their components shown in FIGS. 7 through 16.

In an example of operation, an AP sends a trigger frame (or a DL OFDMA PPDU 600), where the AP specifies the STAs that are expected to participate in forming the UL MU frame (or a UL OFDMA PPDU 702). In addition, the AP specifies the one or more sub-bands that are allocated to each STA, including the specification of PHY and MAC attributes such as MCS/NSS and duration for each STA. The AP may allocate larger assignments (e.g., wider sub-bands or a larger number of tones) to the STAs, where the AP determines that the STAs have buffered data to send in the UL MU frame. Alternatively, the AP may allocate smaller assignments (e.g., narrower sub-bands or a smaller number of tones) to the STAs, where the AP determines that the STAs have less buffered data to send in the UL MU frame, or the AP has no knowledge of whether the STAs have any data to send in the UL MU frame. In such small assignments, the STA may send a short frame. In one aspect, a short frame may be, for example, a short data frame, a QoS null frame, a power save (PS)-poll frame, a ULR frame, a management frame, a control frame, or a data frame with an extended control field.

In FIG. 7, each STA, which participates in forming the UL MU frame 702, generates and transmits its respective, individual uplink frame that includes a header 706 and its payload frame. For example, STA1 generates and transmits a first uplink frame comprised of a header 706 and a payload frame 710 (or PSDU) (which may be a short frame). STA2 generates and transmits a second uplink frame comprised of a header 706 and a payload frame 711 (which may be a short frame). STA3 generates and transmits a third uplink frame comprised of a header 706 and a payload frame 712. STA4 generates and transmits a fourth uplink frame comprised of a header 706 and a payload frame 713 (which may be a short frame). STA5 generates and transmits a fifth uplink frame comprised of a header 706 and a payload frame 714 (which may be a short frame). All of the first, second, third, fourth and fifth uplink frames are RF combined or aggregated to form a final uplink frame, which is the UL MU frame (or the UL OFDMA PPDU 702) for the AP. As all of the STAs are synchronized and transmit their respective uplink frames (e.g., the first, second, third, fourth and fifth uplink frames) at the same time (e.g., upon the completion of a predetermined time period, such as IFS 704, after receiving the trigger frame), all of these respective uplink frames are multiplexed simultaneously into the UL MU frame 702.

In the example, the AP allocates a small assignment to each of STA1, STA2, STA3, and STA4 (which generates the PSDU 710, 711, 713 and 714, respectively). In other words, each of STA1, ST2, STA3, and STA4 is assigned with a small number of tones (or one sub-band or a narrow sub-band). The AP allocates a larger assignment to STA3 (which generates the PSDU 712). In other words, STA3 is assigned with a larger number of tones (or multiple sub-bands or a wider sub-band).

In one aspect, a header 706 includes a legacy header (e.g., L-LTF, L-STF, L-SIG). The header 706 may also include a HE header (e.g., a HE SIG-A and/or a HE SIG-B). In one or more aspects, each STA (e.g., each of STA1, STA2, STA3, STA4 and STA5) generates a legacy header utilizing the entire UL channel bandwidth. A legacy header of an STA is thus associated with (or occupies) the entire UL channel bandwidth (rather than a sub-band). In one aspect, an STA modulates a legacy header utilizing the entire UL channel bandwidth. For example, if the UL channel bandwidth is 80 MHz, an STA modulates the legacy header with FFT size of 64 on a 20 MHz sub-channel and duplicates the modulated legacy header on the remaining three 20 MHz sub-channels so that the legacy header occupies the entire 80 MHz bandwidth. A HE header may be associated with (or occupy) the entire UL channel bandwidth.

Each payload or PSDU (e.g., each of the PSDU 710, 711, 712, 713 and 714 of STA1, STA2, STA3, STA4 and STA5, respectively) is associated with (or occupies) its sub-band or sub-bands assigned to its respective STA. A payload or PSDU of each STA is modulated using the sub-band or sub-bands assigned to the STA rather than the entire UL channel bandwidth.

In one aspect, a baseband processor (e.g., a baseband processor 210 in FIG. 2, or a MAC processor 211) of an STA can generate and provide a payload frame or PSDU. In one aspect, a baseband processor (e.g., a baseband processor 210 in FIG. 2, or a PHY processor 215 or a TX signal processing unit 280) of an STA can generate and facilitate transmission of its uplink frame directed to an AP.

In one aspect, the UL OFDMA PPDU 702 has a channel bandwidth that is the same as the channel bandwidth of the preceding DL OFDMA PPDU 600; however, in some situations the bandwidths may be different. A legacy header of each of the first, second, third, fourth and fifth uplink frames is associated with the entire UL channel bandwidth of the respective uplink frame or the UL OFDMA PPDU 702. Likewise, the legacy header of the UL OFDMA PPDU 702 is associated with the entre channel bandwidth of the UL OFDMA PPDU 702.

Figure 8:
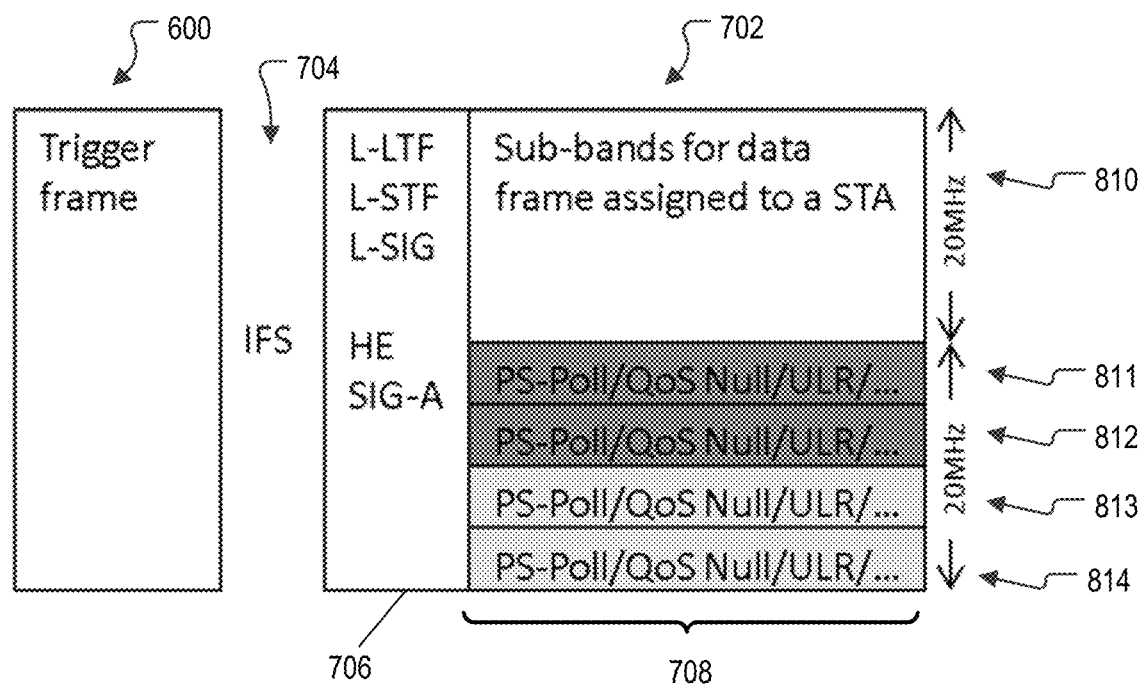
FIG. 8 illustrates a schematic diagram of another example of a downlink frame and an uplink frame with an illustration of sub-bands.

FIG. 8 illustrates a schematic diagram of an example of a downlink frame 600 and an uplink frame 702 with an illustration of sub-bands. The example shown in FIG. 8 is similar to the example shown in FIG. 7, except that an AP allocates a large assignment to a first STA (STA1), which generates an uplink frame having a PSDU 810, and the AP allocates smaller assignments to STA2, STA3, STA4 and STA5, which generate uplink frames having PSDUs 811, 812, 813 and 814, respectively. The AP allocates large assignments (e.g., wider sub-bands) to the STAs where the AP has determined they have buffered data to send in UL, and allocates small assignments (e.g., narrow sub-bands) to the STAs where the AP has determined the STAs have less buffered data to send in UL, or the AP does not know whether the STAs have any data to send in UL. In order for the AP to seek some status from its associated STAs, the AP may allocate small assignments to a set of STAs (that are identified by some group identification such as GID). In this example, the size of a sub-band assigned to STA1 is 20 MHz, and the size of a sub-band assigned to each of STA2, STA3, STA4 and STA5 is 5 MHz.

Referring to FIGS. 7 and 8, the AP sends a trigger frame (either in an OFDM PPDU or as payload within a DL OFDMA PPDU 600), where the AP schedules the UL OFDMA PPDU 702 to be sent after a predetermined time period (e.g., an IFS time interval 704) after the STAs receive the DL OFDMA PPDU 600. In one aspect, at least one relatively large assignment is assigned to an STA where the AP has knowledge of the STA's queue size. Relatively small assignments are assigned to other STAs that: (a) the AP determines that these STAs do not have a large queue size (e.g., not exceeding a predetermined threshold) and such STAs may send short frames (e.g., remaining data, short data frames, QoS null frames, PS-poll frames, ULR frames, etc.); (b) the AP has no knowledge of the queue size of such STAs, and such STAs may send short frames; or (c) are a set of STAs (e.g., remaining STAs that are associated with the AP and are in awake state), where the set of STAs can send short frames in a random access fashion (i.e. none, one or more STA may send short frames in a specific sub-band). In some aspects, the partitioning of the full-band to sub-bands for the above-identified categories is arbitrary.

FIGS. 9 through 16 illustrate schematic diagrams of several examples of a downlink frame and an uplink frame with varying uplink multiuser assignments. In these figures, several examples of an exchange of a trigger frame 600 (that announces the partitioning structure of the sub-bands and the specific STAs or set of STAs that are assigned to each sub-band) and a UL OFDMA frame 702 are shown. The bandwidth size of each sub-band partition and the number of sub-band partitions may vary depending on implementation.

An uplink transmission may include sub-band partitioning for 20 MHz (see, e.g., 902, 1002, 1102, 1202, 1302, 1402) or for 40 MHz (see, e.g., 1502, 1602), where the minimum sub-band bandwidth is, for example, 2 MHz. While FIGS. 9 through 16 illustrate a channel bandwidth of 20 MHz or 40 MHz, a different channel bandwidth can be utilized (e.g., 80 MHz, 160 MHz, or 80+80 MHz), and a channel bandwidth is not limited to the examples shown in these figures. Note that some portions of the 2 MHz bandwidth are used for some tones or guard bands that are not used for data; hence the actual bandwidth of the sub-band is less that 2 MHz. Similarly, when a reference is made to 4 MHz sub-band, the exact bandwidth used for data transmission is less than 4 MHz. In some embodiments, a sub-band may be identified as the number of tones it has with FFT 256. For 2 MHz, 4 MHz, 8 MHz, 20 MHz, 40 MHz, and 80 MHz the number of tones respectively are: 26, 52, 106, 242, 484, and 996. Therefore, in this embodiment, when a reference is made to a sub-band with bandwidth 2 MHz, 4 MHz, 8 MHz, 20 MHz, 40 MHz, and 80 MHz it is equivalent to reference to a sub-band with 26, 52, 106, 242, 484, and 996 tones per sub-band, respectively.

In one or more aspects, two or more sub-bands are combined to form one or more wider sub-bands. For example, two sub-bands of 2 MHz each are combined together to form a 4 MHz sub-band. In another example, four sub-bands of 2 MHz each are combined to form an 8 MHz sub-band. In some implementations, a sub-band (e.g., 720) is not allowed to be joined with another sub-band (e.g., an adjacent sub-band(s)) to form a wider sub-band.

In operation, the AP may assign some of the narrow sub-bands (e.g., 2 MHz) to some STAs that do not have much payload to send in the UL OFDMA PPDU 702, or to some STAs where the AP does not know whether the STAs have any payload to send in the UL OFDMA PPDU 702. In order for the AP to obtain status information from associated STAs, the AP may allocate some of the small assignments (e.g., 2 MHz) for a set of STAs (e.g., STAs identifiable by a group identification such as the GID). For a small assignment, the STA may send a short frame.

In one aspect, an AP assigns the 2 MHz sub-bands in the sub-band partitioning (intended for short data transmissions) to some STAs that the AP knows such STAs would have a short data frame to send. Alternatively, the AP assigns all of the 2 MHz sub-bands to a set of STAs, or the AP assigns a specific sub-band (e.g., 720) to a set of STAs (so that the set of STAs send a payload in a random access fashion), so that the AP obtains queue status information or frequency-selectivity state information when the STAs send a short frame in each assigned sub-band. In some aspects, the AP performs a combination of the two previous cases where some sub-bands are assigned to specific STAs for data frame transmission, and some sub-bands are assigned to a set of STAs, or to all associated STAs, to send in a random access fashion their queue size information or frequency-selectivity status information using short frames.

Figure 9:
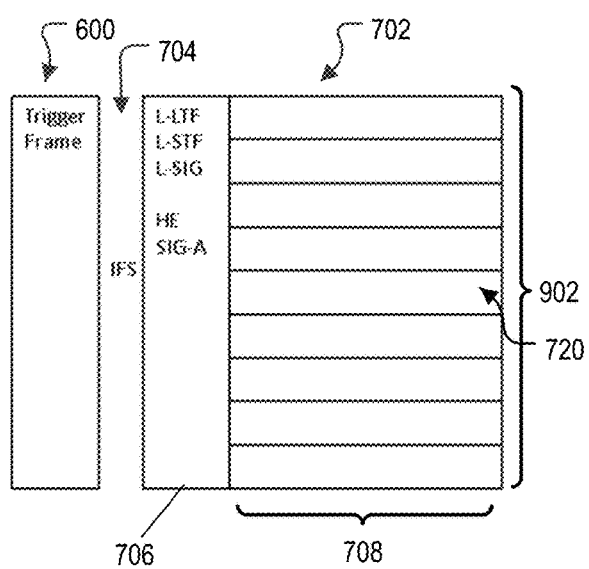
FIGS. 9 through 16 illustrate schematic diagrams of examples of a downlink frame and an uplink frame with varying uplink multiuser assignments.
Figure 10:
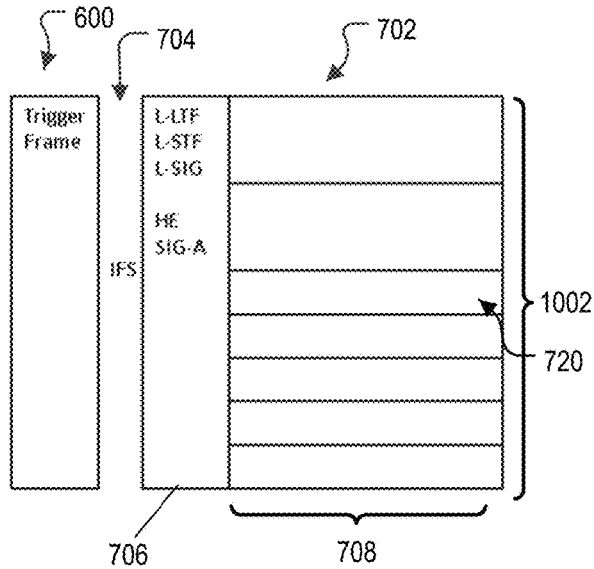
Figure 11:
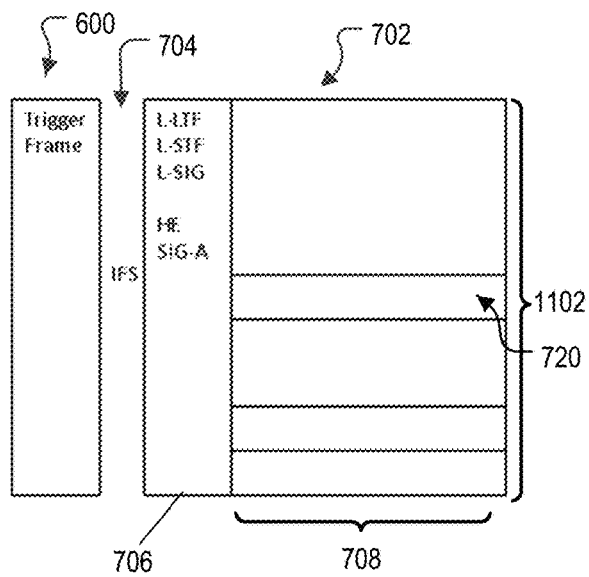
Figure 12:
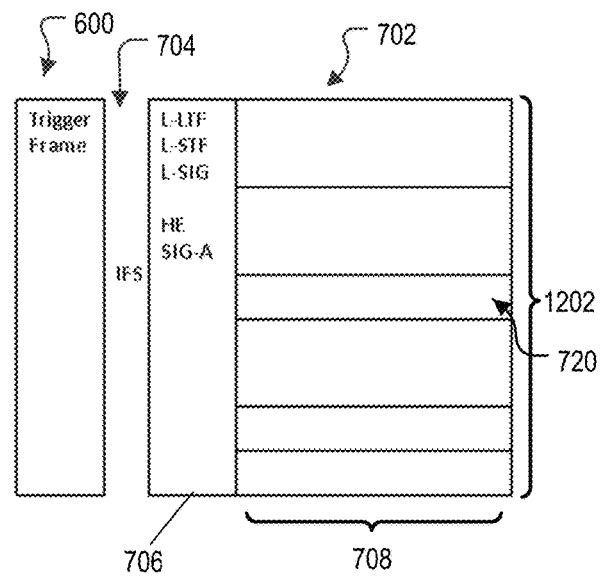

In FIG. 9, illustrates a schematic diagram of an example of a downlink frame 600 and an uplink frame 702, where the uplink transmission includes sub-band partitioning 902 for 20 MHz where each sub-band is 2 MHz, and there are a total of nine 2 MHz sub-bands (note that some portions of the 20 MHz bandwidth are used for some unused tones or guard bands, but these are not shown in this figure). In FIG. 10, the uplink transmission includes sub-band partitioning 1002 for 20 MHz where at least two sub-bands are 4 MHz each, and five sub-bands are 2 MHz each. In FIG. 11, the uplink transmission includes sub-band partitioning 1102 for 20 MHz where one sub-band is 8 MHz, one sub-band is 2 MHz, one sub-band is 4 MHz, and two sub-bands are 2 MHz each. In FIG. 12, the uplink transmission includes sub-band partitioning 1202 for 20 MHz where two sub-band are 4 MHz each, one sub-band is 2 MHz, one sub-band is 4 MHz, and two sub-bands are 2 MHz each.

Figure 13:
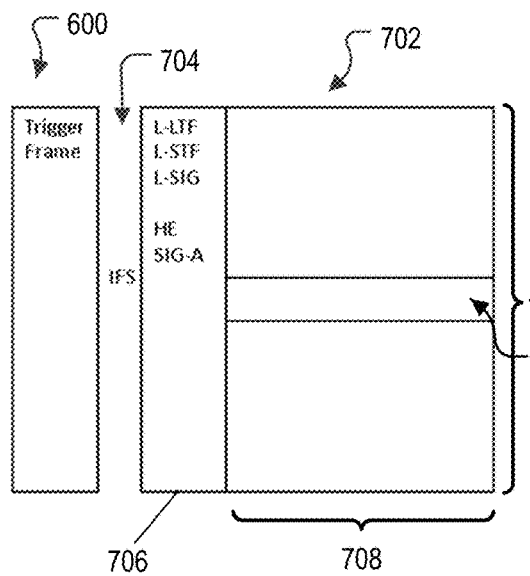
Figure 14:
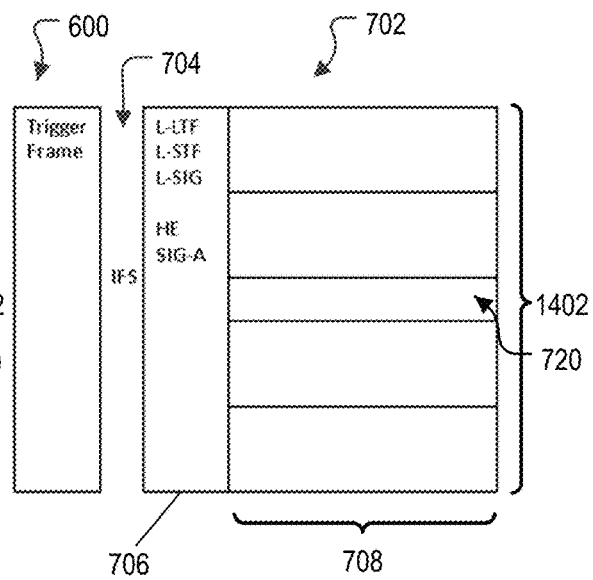

FIGS. 13 and 14 illustrate schematic diagrams of examples of a downlink frame 600 and an uplink frame 702, where the AP assigns two or four wide sub-bands for the STAs that the AP knows their queue status information (or buffered data size). In FIG. 13, the uplink transmission includes sub-band partitioning 1302 for 20 MHz where two sub-bands are 8 MHz each, and one sub-band (e.g., 720) is 2 MHz. In FIG. 14, the uplink transmission includes sub-band partitioning 1402 for 20 MHz where four sub-bands are 4 MHz each, and one middle sub-band (e.g., 720) is 2 MHz. In FIGS. 13 and 14, the AP assigns one narrow sub-band (e.g., 720) to a specific STA or a set of STAs so that such STA(s) can send short frames (e.g., short data frames, QoS null frames, PS-poll frames, ULR frames, etc.). In some implementations, the AP may always leave one sub-band (e.g., the middle 2 MHz sub-band 720) for a set of STAs or for all the associated STAs to allow such STAs to send their short frames.

Figure 15:
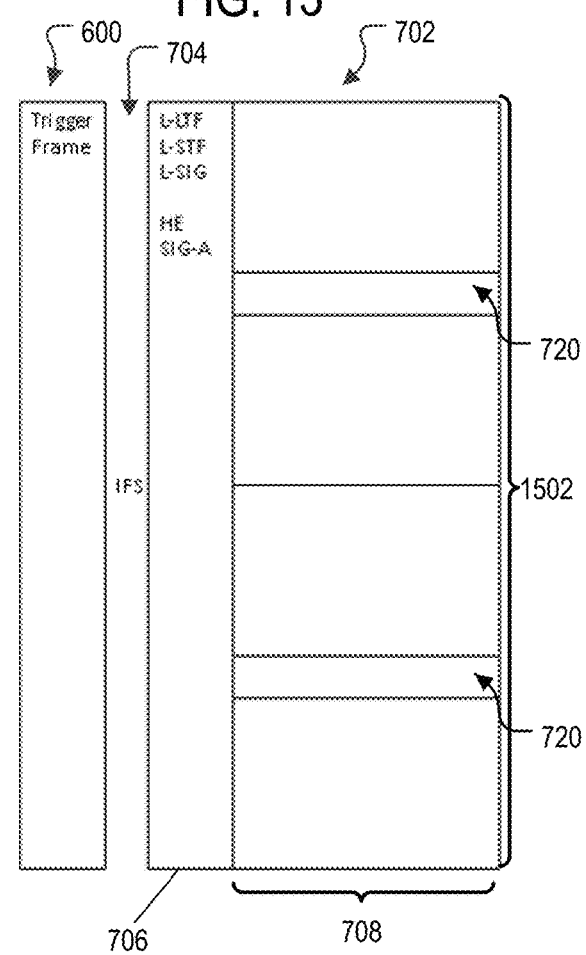
Figure 16:
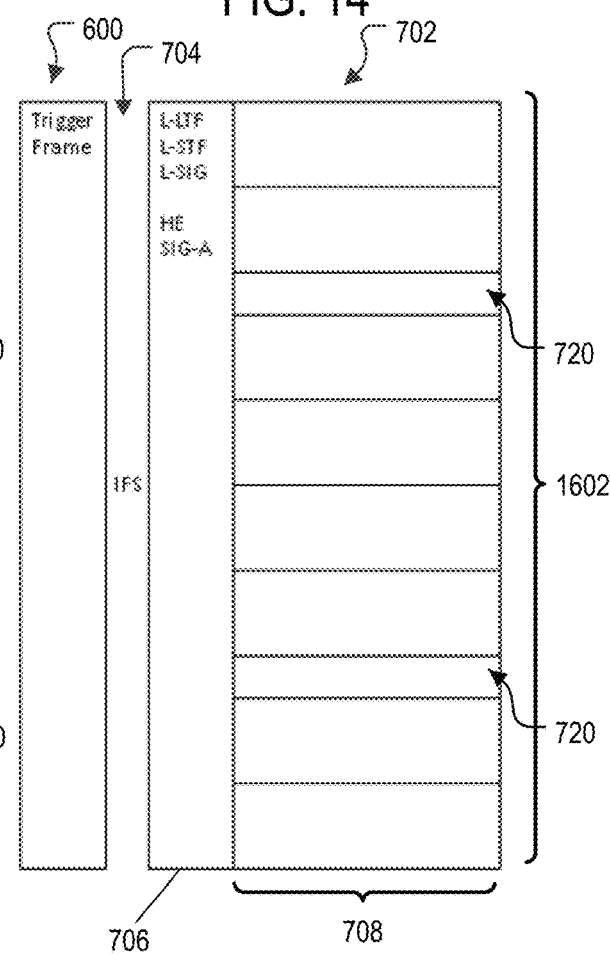

FIGS. 15 and 16 illustrate schematic diagrams of examples of a downlink frame 600 and an uplink frame 702. FIGS. 15 and 16 are extensions of FIGS. 13 and 14 for the case of 40 MHz PPDU, where the same structure shown in FIGS. 13 and 14 apply to each of the 20 MHz sub-channels. The bandwidth size of each sub-band partition and the number of sub-band partitions may vary depending on implementation.

In FIG. 15, an uplink transmission includes sub-band partitioning 1502 for 40 MHz where four sub-bands are 8 MHz each, and two sub-bands (e.g., 720) are 2 MHz each. In FIG. 16, an uplink transmission includes sub-band partitioning 1602 for 40 MHz where eight sub-bands are 4 MHz each, and two sub-bands (e.g., 720) are 2 MHz each. In FIGS. 15 and 16, the AP may assign the four 8 MHz sub-bands (see FIG. 15) or eight 4 MHz sub-bands (see FIG. 16) to the STAs that the AP knows their queue status, and the two narrow sub-bands (e.g., 2 MHz sub-bands 720 in each of FIGS. 15 and 16) are assigned by the AP to specific STAs or to a set of STAs so that the STAs can send short frames within the assigned sub-bands. In some implementations, the AP may always assign the narrow sub-band in each 20 MHz portion (e.g., 720) for a set of STAs or for all the associated STAs to allow such STAs to send their short frames in a random access fashion.

In one aspect, when one sub-band or multiple sub-bands (e.g., 720) are assigned to a set of STAs, or all of the STAs associated with an AP, such sub-band(s) are available to all such STAs (rather than to just one STA), and any one of such STAs can utilize such sub-band(s). Hence, this can be viewed as random access or random assignment because any one of the STAs can elect to use the sub-band(s) and transmit its uplink frame using such sub-band(s), where the payload of such STA occupies the assigned sub-band(s). It is possible that none of the STAs decides to utilize such sub-band(s). Alternatively, multiple STAs may decide to use such sub-band(s), and simultaneously transmit frames using the sub-bands in which case it can cause collision. In one aspect, it would be left to the AP to make a tradeoff between these underutilization or overutilization cases.

Similar to FIGS. 15 and 16, sub-band partitioning may apply to 80 MHz PPDUs, where in some implementations, the AP may always leave a narrow sub-band in each 20 MHz portion (e.g., four 2 MHz sub-bands) for a set of STAs or for all the associated STAs to send their short frames in a random access fashion. In some implementations, the scheduling of each of the narrow sub-band (e.g., 2 MHz), in a 40 MHz or 80 MHz or 160 MHz PPDU, could be based on some partition among the STAs based on their AID/PAID, e.g., based on the LSB bit or two LSB bits of AID/PAID.

In one or more implementations, the AP announces in a trigger frame (e.g., the DL OFDMA PPDU 600) the identification of the STAs that are expected to participate in forming a UL MU PPDU (e.g., the UL OFDMA PPDU 702). The identification may be based on the AID, the PAID or any shorter form of the AID/PAID provided that the identification uniquely identifies an STA. This is applicable to large assignments (e.g., wide sub-bands) that are assigned to the STAs having a relatively large queue size, as well as to short assignments (e.g., narrow sub-bands) where the AP attempts to obtain the queue status of a specific STA. On the other hand, the AP may announce one or more narrow sub-bands for one or more sets of STAs in an expectation that at least one STA among each set of STAs sends in a random access fashion a short frame (via which the STA identifies its queue status to the AP), in which case the set of STAs are identified by group-identification.

In some aspects, to identify a set of STAs, the AP may use some group-identification such as GID, where each GID is a priori known to the AP and to the STAs that belong to the GID. In some cases, the AP may allow all the associated STAs to possibly send any of the above-mentioned frames, in which case the AP may use a reserved GID value that is identified and that all the STAs can participate. In some embodiments, a lack of any STA identification can be interpreted as a group-identification for all the associated STAs to participate in a random access fashion.

Figure 17:
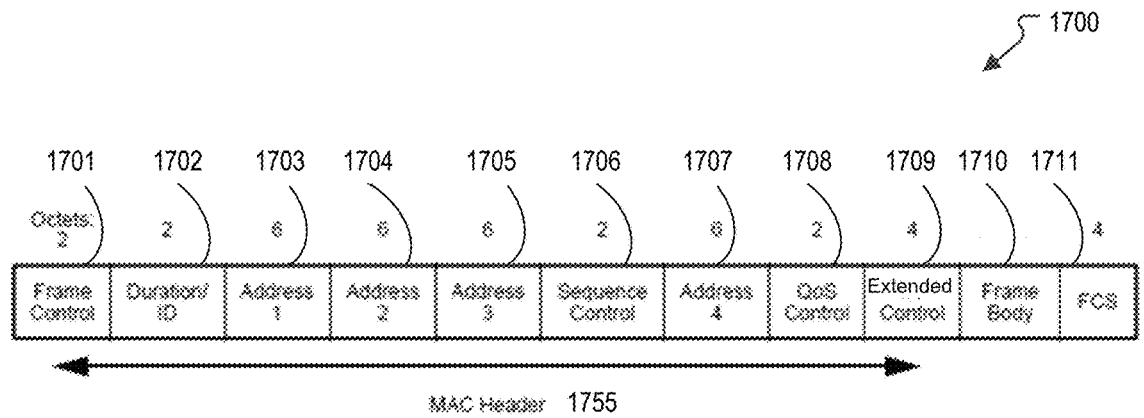
FIG. 17 illustrates an example of a data frame.

FIG. 17 illustrates a schematic diagram of an example of a data frame 1700. The data frame 1700 includes a frame control field 1701, a duration field 1702, address fields 1703 through 1705 and 1707, a sequence control field 1706, a QoS control field 1708, an extended control field 1709 (sometimes referred to as an extended HT control field or an HT control field), a frame body 1710 and a frame check sequence (FCS) field 1711. In one aspect, a data frame 1700 may be one of the frames (e.g., 710 in FIG. 7) for a payload section of a UL MU frame 702.

In one or more implementations, the data frame 1700 may be a QoS null frame, which may be referred to as a QoS null (no data) frame. A QoS null frame is a frame that has a MAC header 1755 but it does not have a payload (i.e., the payload size is zero, or the size of a frame body 1710 is zero). Hence, after the MAC header 1755, the FCS field 1711 follows immediately. While the QoS null frame does not have a payload, its MAC header 1755 has a QoS control field 1708.

Table 1 below illustrates components of a QoS control field 1708. The QoS control field 1708 includes a traffic identifier (TID) subfield, an acknowledgment (Ack) policy subfield, a transmission opportunity (TXOP) duration requested subfield, and a queue size subfield.

the MSDU or A-MSDU of a current QoS null frame) in the delivery queue used for MSDUs and A-MSDUs with TID values equal to the value in the TID subfield of the QoS control field. In some aspects, a queue size value of 0 may be used to indicate the absence of any buffered traffic in the queue used for the specified TID. A queue size value of 254 may be used for all sizes greater than 64768 octets. A queue size value of 255 may be used to indicate an unspecified or unknown size. If a QoS null frame is fragmented, the queue size value may remain constant in all fragments even if the amount of queued traffic changes as successive fragments are transmitted.

In other implementations, the queue size value indicate the total sizes of all queues for all access categories (AC) regardless of the TID value (in such case the TID subfield, which are bits 0-3 of the QoS control field, is reserved). To indicate this, the Bit 7 in the QoS control field of the QoS null frame is set to 0. The queue size value is the total size, rounded up to the nearest multiple of SIZE1=256 octets and expressed in units of SIZE1=256 octets, of all MSDUs and A-MSDUs buffered at the STA (excluding the MSDU or A-MSDU of the current QoS data frame) in the delivery queue used for MSDUs and A-MSDUs with any TID value. In another implementation, the Bit 7 of the QoS control field of the QoS null frame is set to 1, which indicates that the queue size for a given access category, where the queue size value is the total size rounded up to the nearest multiple of SIZE2=256 octets and expressed in units of SIZE2=256 octets, of all MSDUs and A-MSDUs buffered at the STA (excluding the MSDU or A-MSDU of the current QoS data frame) in the delivery queue used for MSDUs and A-MS-DUs with the same access category as the access category of the TID that is indicated in the carrying QoS control field. For example, if the TID value is associated with AC V0, then the queue size is the total queue size for all the TIDs that are associated with AC V0. In another example, if the TID value is associated with AC V1, then the queue size is the total queue size for all the TIDs that are associated with AC V1. However, it is noted that in some implementations, the preference may be that when the Bit 7 of the QoS control field of the QoS null frame is set to 1 then this would indicate that the queue size is the queue size for a given TID whose value is indicated in Bits 0-3 of the QoS control field. It is also noted that in general while the implementations

TABLE 1

| Applicable Frame Sub Types | Bits 0-3 | Bit 4 | Bits 5-6 | Bit 7 | Bit 8 | Bit 9 | Bit 10 | Bits 11-15 |
| --- | --- | --- | --- | --- | --- | --- | --- | --- |
| QoS null frames sent by non-AP STAs that are not a TPU buffer STA or a TPU sleep STA in a non-mesh BSS. | TID | 0 | Ack Policy | Reserved | TXOP Duration Requested | | | |
| | TID | 1 | Ack Policy | Reserved | Queue Size | | | |

Note:
TPU refers to TDLS peer U-APSD, where TDLS refers to tunneled direct-link setup, and U-APSD refers to unscheduled automatic power save delivery.

The queue size subfield is an 8-bit field that indicates the amount of buffered traffic for a given traffic category (TC) or traffic stream (TS) at the STA sending this frame. The queue size subfield is present in the QoS null frames sent by non-AP STAs with bit 4 of the QoS control field equal to 1. The AP may use information contained in the queue size subfield to determine the TXOP duration assigned to the STA. The queue size value is the total size, rounded up to the nearest multiple of 256 octets and expressed in units of 256 octets, of all MAC service data units (MSDUs) and aggregate MSDUs (A-MSDUs) buffered at the STA (excluding described above may be used in some frames, another implementation may be used in some other frames, and in general, SIZE1 and SIZE2 may have different values.

Figure 18:
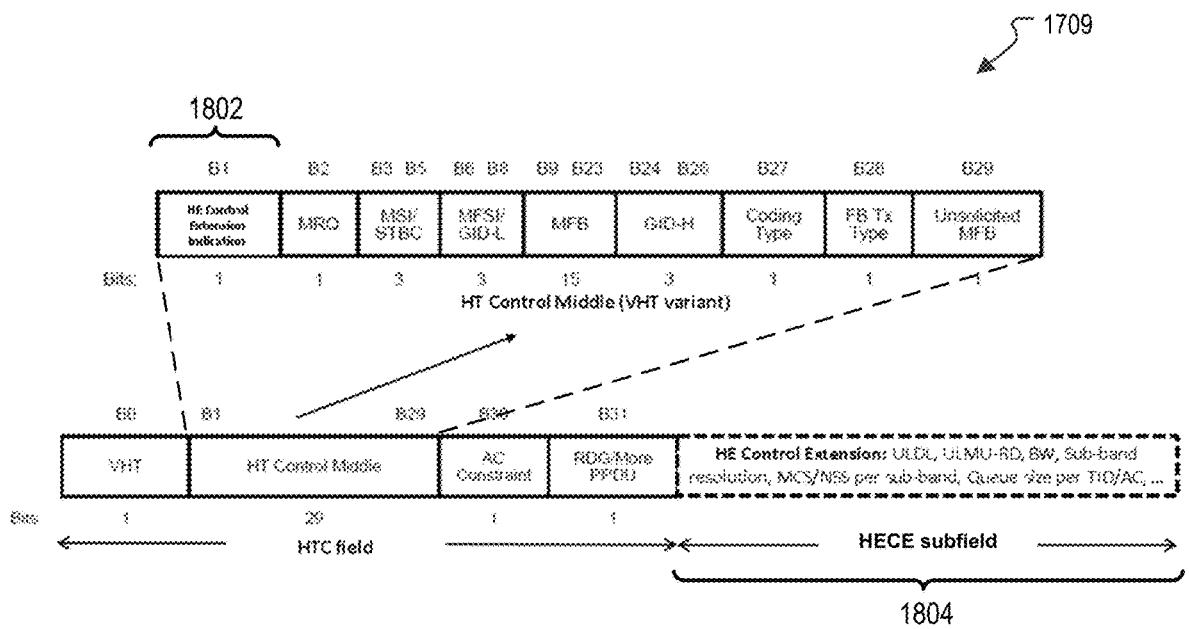
FIG. 18 illustrates an example of an extended control field of the data frame in FIG. 17.

FIG. 18 illustrates an example of the extended control field 1709 of the data frame 1700. For convenience, the extended control field 1709 is sometimes referred to as an extended HT control field or an HT control field. In one or more implementations, an STA may use both the QoS control field 1708 (shown in Table 1) and the HT control field 1709 (having the HECE subfield 1804) to convey information relating to the queue size and/or frequency selectivity status of the STA to its associated AP. The HT control field 1709 may include a HE control extension indication (HECEI) field 1802, which may be located in an HT control middle section of the HT control field 1709. The HT control field 1709 may also include a HECE subfield 1804. This HT control field 1709 and QoS null frame may exist in any other type of data frame depending on implementation including QoS Null data frame.

In one aspect, if the HECEI field is set to 1, then the HECE subfield 1804 exists; otherwise the HECE does not exist. In one or more implementations, the HECE subfield 1804 carries one or more of the following information: VLDL, bandwidth, sub-band resolution, MCS and NSS per sub-band (or per each of the sub-bands with the mentioned sub-band resolution), buffer-status or queue size per TID, or alternatively, buffer-status or queue size per AC, quality indicator of the full-band or sub-bands. Note that one or more of the above-identified subfields in the HECE subfield 1804 are optional, or may appear based on some indication. Depending on an indicator that appears at a given location, e.g., the beginning of the HECE subfield 1804, the reported parameters in the remaining portion of the HECE subfield 1804 is indicated, e.g., the HECE subfield 1804 includes a subset of the attributes listed above. For example, with a reserved value appearing in the indicator, the queue size and/or buffer status per AC or all ACs is reported in the HECE subfield 1804. In another example, with another reserved values appearing in the indicator, an additional indication of the queue size per AC or per TID 15 reported in the HECE subfield 1804. In another example, with another reserved value appearing in the indicator, MCS, NSS or some quality indicator (such as SNR or RSSI) is reported in the HECE subfield 1804. In another example, with another reserved value appearing in the indicator, duration or sub-band assignment of a subsequent response frame is reported in the HECE subfield 1804. Accordingly, the indicator value in the HECE subfield 1804 indicate the parameters in the HECE subfield 1804.

When the ULDL subfield in the HECE subfield 1804 is set to one, the indicated values for the MCS and NSS per sub-band in the HECE subfield 1804 are values that the STA intends to employ for each specified sub-band in the next (or one or more subsequent) UL OFDMA PPDUs or UL MIMO PPDUs.

The values provided in the HECE subfield 1804 may be used when an STA intends to participate in forming an upcoming UL OFDMA PPDU or UL MU MIMO PPDU, and the STA intends to notify the AP on which MCS and NSS values are intended to be used in the specified sub-bands provided that the AP creates an assignment for the STA in any of the sub-bands. In this case, the MCS and NSS values may be used by the AP in creating the STA assignment, sub-band assignment, and spatial-stream (SS) assignment of the one or more subsequent UL OFDMA PPDUs or UL MIMO PPDUs. In some aspects, if the AP assigns more than one sub-band with the specified resolution to the STA in the next UL OFDMA PPDU or UL MU MIMO PPDU, then the STA may use the more robust MCS and NSS values across two or more sub-bands.

When the ULDL subfield in the HECE subfield 1804 is set to zero, the indicated values in the HECE subfield 1804 are recommended values directed to the MCS and NSS or some other quality indicators (such as RSSI or SNR) per sub-band for the AP to use in the next (or one or more subsequent) DL OFDMA PPDUs. For example, the MCS and NSS values may be a recommendation to the AP on which MCS or NSS values to use for the next DL OFDMA or DL MU MIMO PPDUs. The recommendation of the MCS and NSS values may be interpreted by the AP as solicited or unsolicited values by the AP, depending on the other subfields in the HT control field 1709. In some aspects, the AP may determine not to include the STA in a next (or one or more subsequent) UL MIMO PPDU or UL OFDMA PPDU based on information reported in the HECE subfield 1804, particularly with respect to the MCS, NSS and/or queue size values, irrespective of the ULDL value.

The ULMU-RD subfield in the HECE subfield 1804 includes information relating to the reverse-direction procedure when an STA allows the AP to take control of the TXOP that the STA has initiated. A subfield in the ULMU-RD subfield is ULMU-Grant (not shown) where if the ULMU-Grant subfield is set to one by the non-AP TXOP-owner, then the STA allows the AP to initiate a UL MU PPDU transmission during the ongoing TXOP. If the ULMU-Grant subfield is set to zero by the TXOP-owner STA, then the STA does not allow the AP to share the TXOP for the purpose of initiating a UL MU PPDU. If the ULMU-Grant subfield is set to one by the AP, then the AP is requesting the STA to allow the AP to initiate a UL MU PPDU transmission during the ongoing TXOP. If the ULMU-Grant subfield is set to zero by the AP, then the AP does not request the STA to share the TXOP for the purpose of initiating a UL MU PPDU. If the STA has not initiated any TXOP, then the values of the ULMU-Grant subfield are reserved. Another subfield in the ULMU-RD subfield is a duration subfield, where the duration subfield indicates that the remaining amount of duration of the TXOP compared to the maximum TXOP that is allowed in the BSS. The duration subfield may include a value set by the STA when the ULMU-Grant subfield is set to one; otherwise, the duration subfield is a reserved value.

In some implementations, the AP and STAs may use the subfields related to Reverse Direction (RD) in the HT control field 1709 to manage cases where the AP intends to use the TXOP (that is initiated by an STA) to initiate a UL MU PPDU. In such cases, two RD-related fields, which include an AC constraint subfield and an RDG/More PPDU subfield, may be used for such signaling. RDG refers to reverse direction grant. If the TXOP-owner STA grants the AP to allow all ACs during the UL MU PPDUs, the TXOP-owner STA sets the AC constraint subfield to zero (e.g., to allow sharing with other ACs); otherwise, the TXOP-owner STA restricts the TXOP-sharing to the same AC that the STA has used when the STA initiated the TXOP. If the TXOP-owner STA sets the RDG/More PPDU subfield to one, then the AP is allowed to use the TXOP for UL MU PPDU; hence, the AP is allowed to send a trigger frame. Otherwise, the TXOP-owner STA does not desire to share its TXOP.

In other implementations, a ULMU-capable STA may be utilized to set the RDG/More PPDU subfield to one. If the AP sets the RDG/More PPDU subfield to one (in a response frame to the frame that has been sent by the TXOP-owner STA), then the AP may send a trigger frame, followed by a UL OFDMA PPDU that is sent by a set of STAs, among them possibly the TXOP-owner STA. If the AP sets the RDG/More PPDU subfield to one in the HT control field 1709 of the trigger frame, then the AP may trigger a second UL MU PPDU to be sent after the first UL MU PPDU initiated by the trigger frame. If the AP sets the RDG/More PPDU subfield to zero in the HT control field 1709 of the trigger frame, the AP does not intend to initiate a second UL MU PPDU after the first UL MU PPDU being initiated by the trigger frame. If the AP sends the trigger frame in a legacy format that does not have an HT control field 1709, then the TXOP-owner STA interprets this trigger frame as have the RDG/More PPDU subfield set to zero (i.e., the AP does not intend to initiate another UL MU PPDU after the one that is being initiated by this trigger frame). If the AP does not respond, then the TXOP-owner STA takes over the medium after a predetermined period (e.g., a PIFS time interval).

In some implementations, when the TXOP-owner STA sets the RDG/More PPDU subfield to one, then the AP is allowed to use the TXOP for a DL transmission, such as sending a SU PPDU to the TXOP-owner STA or sending a DL MU PPDU (e.g., DL MU MIMO PPDU or DL OFDMA PPDU) to a set of STAs that include the TXOP-owner STA, and/or for initiating a UL MU PPDU (by sending a trigger frame). In such embodiments, a TXOP is used for DL MU frames (sent by the AP to a set of STA) as well as to initiate UL MU frames in response to Trigger frames (sent by the AP to the same set or another set of STAs but with some common STAs in both sets). In some embodiments, the TXOP is used for DL MU frames (sent by the AP to a set of STA) only.

In some implementations (where the HECE subfield 1804 is not implemented), the STA may use the bit B1 (e.g., the HECEI 1802) in the HT control middle section of the HT control field 1709 to indicate whether the AP is allowed to use the granted RD for initiating a UL MU PPDU or not. In this case, if the TXOP-owner STA sets the B1 to one, and sets the RDG/More PPDU subfield to one, then the AP is allowed to use the TXOP for a DL transmission as well as for initiating (or triggering) a UL MU transmission. If the TXOP-owner STA sets the B1 to zero, and sets the RDG/More PPDU subfield to one, then the AP is allowed to use the TXOP for a DL transmission toward the TXOP-owner STA but the AP is not allowed to initiate (or trigger) a UL MU transmission. If the TXOP-owner STA sets the RDG/More PPDU subfield to zero, then the value of B1 is reserved, and the STA does not allow the AP to use the TXOP for a DL transmission of data or management frames.

If the AP sets the B1 to one, and sets the RDG/More PPDU subfield to one, then the AP requests to use the TXOP for a DL transmission as well as for initiating (or triggering) a UL MU transmission. If the AP sets the B1 to zero, and sets the RDG/More PPDU subfield to one, then the AP requests to use the TXOP for a DL transmission toward the TXOP-owner STA (and possibly to send one or more DL MU PPDUs that possibly includes the TXOP-owner). In this case, the AP does not intend to initiate a UL MU transmission. If the AP sets the RDG/More PPDU subfield to zero, then the value of B1 is reserved, and the AP does not desire to use the TXOP for DL transmission of data or management frames.

In some implementations, if the TXOP-owner STA sets the RDG/More PPDU subfield to zero, then the value of B1 indicates whether the HECE subfield 1804 is present within the HT control field 1709. If the TXOP-owner STA sets the RDG/More PPDU to one, then the value of B1 and the associated interpretations are as described above.

In some implementations, the signaling for transferring the TXOP from the TXOP-owner STA to its associated AP may be based on a capability subfield in HE capabilities. In such case, provided that the STA is a ULMU-capable STA, the TXOP-owner STA allows its associated AP to take control of the TXOP (which the STA owns) after a time period (e.g., a SIFS time interval) after the last response frame that the AP sends to the STA. In some aspects, the AP takes control during at least a portion of the response frame that the AP sends to the TXOP-owner STA. While the AP can take control of a TXOP that is owned by a ULMU-capable STA, the AP may exercise some caution to avoid taking control of a TXOP that is either short or it does not have much time remaining (e.g., the duration subfield of the last received frame from the TXOP-owner STA indicates that the remaining portion of the TXOP time is less than a duration threshold value). In one or more implementations, the AP assigns sub-bands to the TXOP-owner STA, unless the TXOP-owner STA has indicated that its queue size is zero.

A bandwidth subfield that is reported in a MCS feedback (MFB) subfield of the HT control middle section of the HT control field 1709 may be interpreted as the bandwidth subfield in the HECE subfield 1804; hence, the bandwidth subfield in the HECE subfield 1804 may be not utilized such that the bandwidth value in the MFB subfield is instead used to report the bandwidth.

The sub-band resolution subfield in the HECE subfield 1804 specifies the sub-band bandwidth for which MCS and NSS are reported. Since the HECE subfield 1804 may be used for DL OFDMA and UL OFDMA operations, depending on the sub-band assignment in an OFDMA PPDU, the suitable MCS or NSS changes depending on the condition of the channel between the AP and the STA at the particular sub-band. In this respect, a list of MCS and NSS values for all the sub-bands with the specified sub-band resolution may be present within the HECE subfield 1804. In some aspects, the bandwidth resolution for MCS and NSS may differ, hence, necessitating two sub-band resolution values to be reported, or in some other cases the bandwidth resolution for NSS may be a priori fixed to, for example, 20 MHz sub-bands.

In one aspect, a subsequent uplink frame may be one or more subsequent uplink frames, and a subsequent uplink frame may be an immediately following frame or a non-immediately following frame. In one or more aspects, a trigger frame 600 shown in FIGS. 7 through 16 may be an RTS frame with modified RA, a CFU frame or an A&T frame. In one or more aspects, an uplink frame 702 in FIGS. 7 through 16 may be a BWR frame or a ULR frame. In one or more aspects, a data frame 1700 may be a payload for a BWR frame or a ULR frame. In one aspect, a BWR frame or a ULR frame may be referred to as a request frame or a response frame. In one aspect, a baseband processor 210 (or a MAC processor 211) may generate a data frame 1700. In one aspect, a baseband processor 210 (or a PHY processor 215 or a TX signal processing unit 280) may generate frames 600 and 702 and generate a PPDU from a data frame 1700. In one aspect, a next-generation STA is a non-legacy STA, and a next-generation STA may be referred to as an STA for convenience.

Like reference numerals may designate like elements. For example, same reference numerals 600, 702, 704, 706, 708, and 720 are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

Figure 19A:
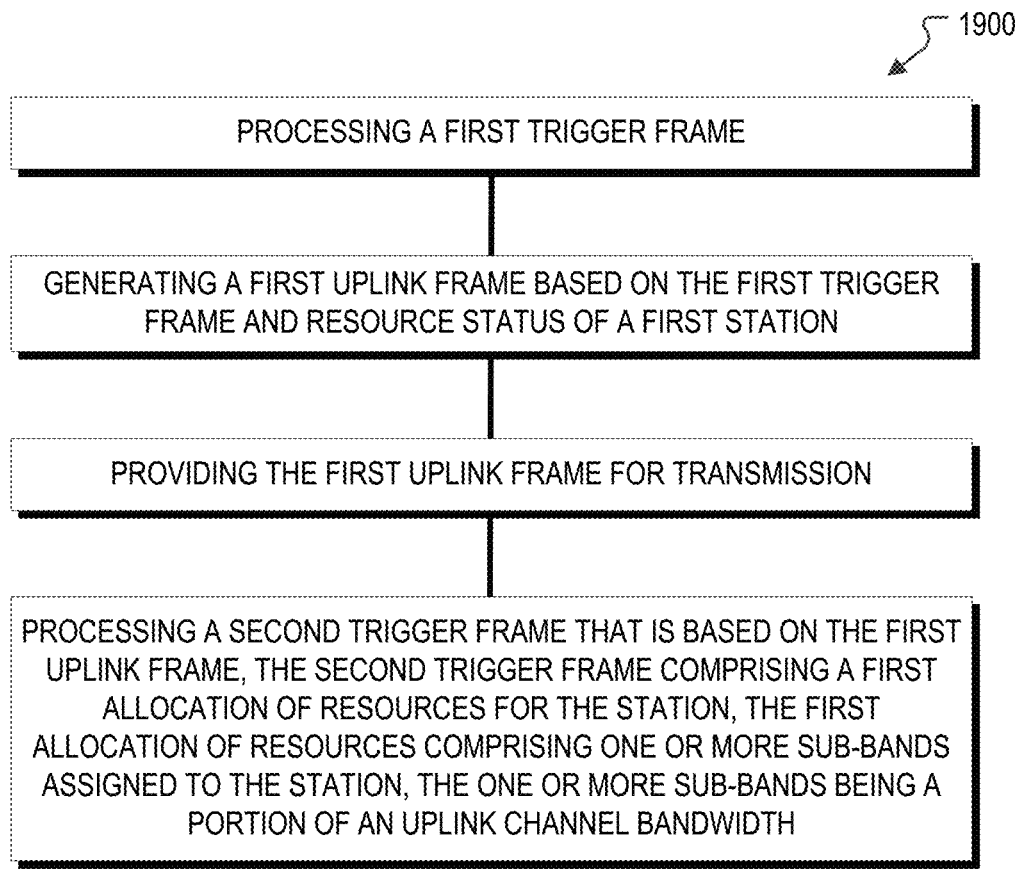
FIGS. 19A, 19B, and 19C illustrate flow charts of examples of multiuser signaling and access request mechanisms.
Figure 19B:
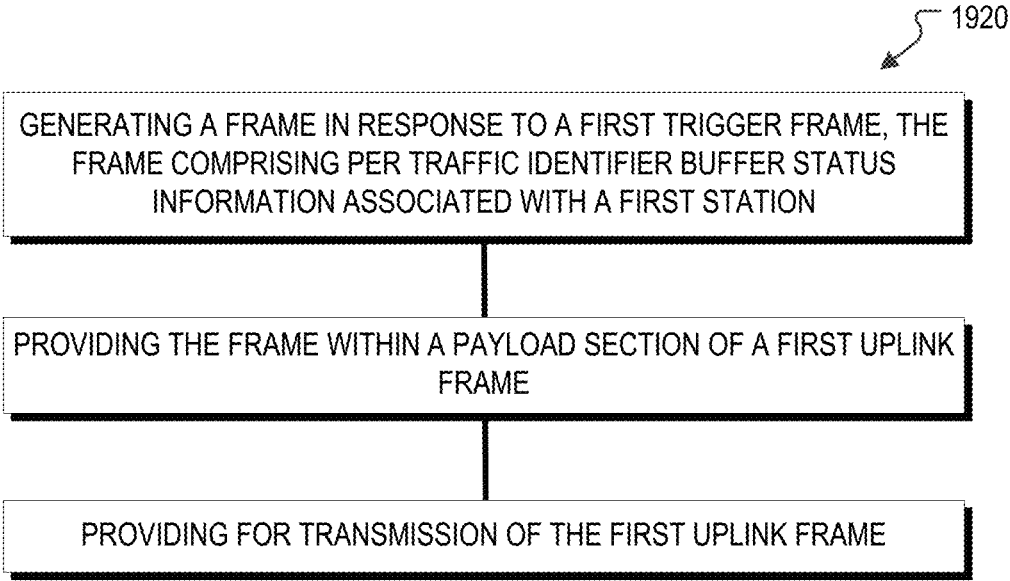
Figure 19C:
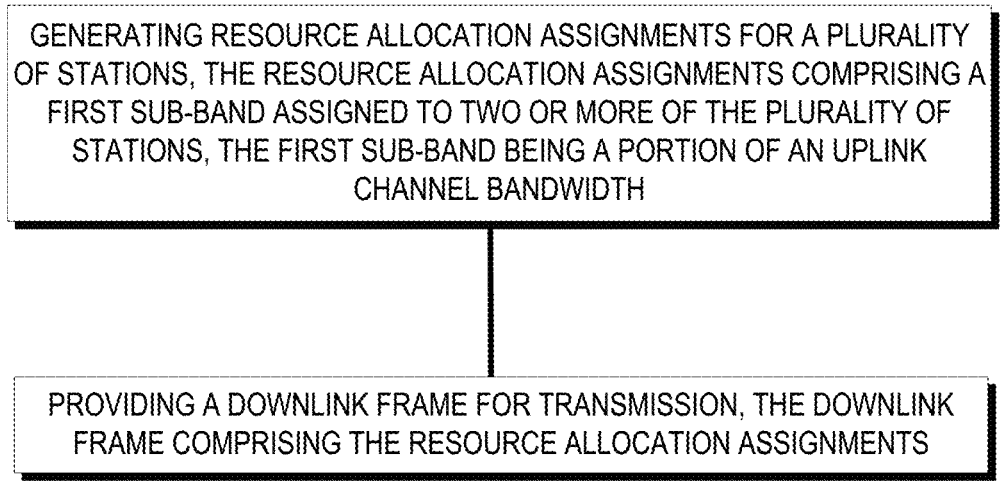

FIGS. 19A, 19B and 19C illustrate flow charts of examples of multiuser signaling and access request mechanisms. For explanatory and illustration purposes, the example processes 1900 and 1950 may be performed by the wireless communication devices 111-115 of FIG. 1 and their components such as a baseband processor 210, a MAC processor 211, a MAC software processing unit 212, a MAC hardware processing unit 213, a PHY processor 215, a transmitting signal processing unit 280 and/or a receiving signal processing unit 290; however, the example processes 1900, 1920 and 1930 are not limited to the wireless communication devices 111-115 of FIG. 1 or their components, and the example processes 1900, 1920 and 1930 may be performed by some of the devices shown in FIG. 1, or other devices or components. Further for explanatory and illustration purposes, the blocks of the example processes 1900, 1920 and 1930 are described herein as occurring in serial or linearly. However, multiple blocks of the example processes 1900, 1920 and 1930 may occur in parallel. In addition, the blocks of the example processes 1900, 1920 and 1930 need not be performed in the order shown and/or one or more of the blocks/actions of the example processes 1900, 1920 and 1930 need not be performed.

Various examples of aspects of the disclosure are described below as clauses for convenience. These are provided as examples, and do not limit the subject technology. As an example, some of the clauses described below are illustrated in FIGS. 19A, 19B and 19C.

Clause A. A station for communicating in a wireless network, the station comprising: one or more memories; and one or more processors coupled to the one or more memories, the one or more processors configured to cause: processing a first trigger frame; generating a first uplink frame based on the first trigger frame and resource status of the station; providing the first uplink frame for transmission; and processing a second trigger frame that is based on the first uplink frame, the second trigger frame comprising a first allocation of resources for the station, the first allocation of resources comprising one or more sub-bands assigned to the station, the one or more sub-bands being a portion of an uplink channel bandwidth.

Clause B. A non-transitory computer-readable storage medium storing computer-executable instructions that, when executed by one or more processors, cause one or more processors to perform operations, the operations comprising: generating a frame in response to a first trigger frame, the frame comprising per traffic identifier (TID) buffer status information associated with a first station; providing the frame within a payload section of a first uplink frame; and providing for transmission of the first uplink frame.

Clause C. A computer-implemented method of facilitating wireless communication, the method comprising: generating resource allocation assignments for a plurality of stations, the resource allocation assignments comprising a first sub-band assigned to two or more of the plurality of stations, the first sub-band being a portion of an uplink channel bandwidth; and providing a downlink frame for transmission, the downlink frame comprising the resource allocation assignments.

In one or more aspects, additional clauses are described below.

A method comprising one or more methods or operations described herein.

An apparatus comprising one or more memories (e.g., 240, one or more internal, external or remote memories, or one or more registers) and one or more processors (e.g., 210) coupled to the one or more memories, the one or more processors configured to cause the apparatus to perform one or more methods or operations described herein.

An apparatus comprising means (e.g., 210) adapted for performing one or more methods or operations described herein.

A computer-readable storage medium (e.g., 240, one or more internal, external or remote memories, or one or more registers) comprising instructions stored therein, the instructions comprising code for performing one or more methods or operations described herein.

In one aspect, a method may be an operation, an instruction, or a function and vice versa. In one aspect, a clause may be amended to include some or all of the words (e.g., instructions, operations, functions, or components) recited in other one or more clauses, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware or software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method of facilitating wireless communication, the method comprising:
   generating a frame in response to a first trigger frame, the frame comprising per traffic identifier (TID) buffer status information associated with a first station;
   providing the frame within a payload section of a first uplink frame; and
   providing, for transmission, the first uplink frame;
   providing, for transmission, a second uplink frame in response to the first trigger frame, prior to providing the first uplink frame; and
   processing a second trigger frame that is based on the per TID buffer status information, the second trigger frame comprising an allocation of resources for the first station, the resources comprising at least one of a duration of the first uplink frame or a duration of the second uplink frame.

2. The computer-implemented method of claim 1, wherein the frame occupies one or more sub-bands, the one or more sub-bands being a portion of an uplink channel bandwidth.

3. The computer-implemented method of claim 1, wherein the second trigger frame comprising an allocation of resources for the first station, the allocation of resources comprising a second one or more sub-bands assigned to the first station, the second one or more sub-bands being a portion of a channel bandwidth of an uplink transmission.

4. The computer-implemented method of claim 1, wherein:
   the frame comprises a quality-of-service control field,
   the quality-of-service control field comprises a queue size or buffer status associated with a traffic identifier of the first station,
   the frame comprises a high-throughput control field,
   the high-throughput control field comprises a first set of one or more binary fields for identifying whether an extension field of the high-throughput control field is present, and
   the extension field comprises operation information parameters of the first station, including OFDMA or uplink multi-user parameters.

5. The computer-implemented method of claim 4, wherein a second set of one or more binary fields identify the operation information parameters included in the extension field.

6. The computer-implemented method of claim 5, wherein the operation information parameters comprise at least one of an uplink multiuser reverse-direction control field associated with transmission opportunity, a bandwidth, a sub-band resolution, a modulation and coding scheme per full-band or sub-band, a number of spatial streams per full-band or sub-band, a buffer status per traffic identifier, and a buffer status per access category.

7. A non-transitory computer-readable storage medium storing computer-executable instructions that, when executed by one or more processors, cause one or more processors to perform operations, the operations comprising:
   providing, for transmission, a first downlink frame;
   processing a first uplink frame in response to the first downlink frame;
   processing a second uplink frame in response to the first downlink frame and subsequent to the first uplink frame, the second uplink frame comprising per traffic identifier (TID) buffer status information associated with a station of a plurality of stations;
   generating resource allocation assignments for the plurality of stations based on the per TID buffer status information, the resource allocation assignments comprising a first sub-band assigned to two or more of the plurality of stations, the first sub-band being a portion of an uplink channel bandwidth; and providing, for transmission, a second downlink frame, the second downlink frame comprising the resource allocation assignments, the resource allocation assignments comprising at least one of a duration of the first uplink frame or a duration of the second uplink frame.

8. The non-transitory computer-readable storage medium of claim 7, wherein the resource allocation assignments further comprises a second sub-band assigned to one station in the plurality of stations and the second sub-band being a portion of the uplink channel bandwidth.

9. The non-transitory computer-readable storage medium of claim 8, wherein a size of the second sub-band is greater than a size of the first sub-band.

10. The non-transitory computer-readable storage medium of claim 7, wherein the resource allocation assignments further comprises a second sub-band assigned to the two or more of the plurality of stations, wherein the first sub-band and the second sub-band are equal in size.

11. The non-transitory computer-readable storage medium of claim 7, wherein the operations comprise receiving the second uplink frame from one of the two or more of the plurality of stations, the second uplink frame comprising a payload section of the one of the two or more of the plurality of stations occupying the first sub-band.

12. The non-transitory computer-readable storage medium of claim 11, wherein the operations comprise:
utilizing, by each of the two or more of the plurality of stations, internal counters to control access to the first sub-band such that access to the first sub-band is limited to a subset of the two or more of the plurality of stations during an uplink transmission.

13. A station for communicating in a wireless network, the station comprising:
one or more memories; and
one or more processors coupled to the one or more memories, the one or more processors configured to cause:
processing a first trigger frame;
providing, for transmission, a first uplink frame in response to the first trigger frame;
providing, for transmission, subsequent to the first uplink frame, a second uplink frame in response to the first trigger frame and based on resource status of the station, the second uplink frame comprising per traffic identifier (TID) buffer status information associated with the station; and
processing a second trigger frame that is based on the per TID buffer status information, the second trigger frame comprising a first allocation of resources for the station, the first allocation of resources comprising one or more sub-bands assigned to the station, the one or more sub-bands being a portion of an uplink channel bandwidth, the resources comprising at least one of a duration of the first uplink frame or a duration of the second uplink frame.

14. The station of claim 13, wherein the second trigger frame comprises a non-uniform resource assignment for a plurality of stations.

15. The station of claim 13, wherein the first trigger frame comprises a uniform resource assignment for a plurality of stations such that each station in the plurality of stations is assigned an equally sized sub-band.

16. The station of claim 13, wherein the first uplink frame comprises resource status information of the station.

17. The station of claim 16, wherein the resource status information comprises at least one of a buffer status, a bandwidth, a sub-band resolution, a full-band or sub-band quality indicator, a modulation and coding scheme per full-band or per sub-band, and a number of spatial streams.

18. The station of claim 13, wherein the resources comprise at least one of a bandwidth, a coding and modulation scheme, and a number of spatial streams.

19. The station of claim 13, wherein the first uplink frame comprises at least one of a frame that includes a power save poll frame and a quality-of-service null frame.

20. The station of claim 13, wherein:
the first or second trigger frame comprises a unicast payload and at least one of a broadcast payload and a multicast payload;
the unicast payload occupies a sub-band of a downlink channel bandwidth; and
the at least one of the broadcast payload and the multicast payload occupies the downlink channel bandwidth.

\* \* \* \* \*